United States Patent
Yushkina et al.

(10) Patent No.: US 12,443,667 B2
(45) Date of Patent: Oct. 14, 2025

(54) CONTEXTUAL SEARCH TOOL IN A BROWSER INTERFACE

(71) Applicant: GOOGLE LLC, Mountain View, CA (US)

(72) Inventors: Yana Yushkina, Seattle, WA (US); Carlos Augusto Marin Capriles, Venice, CA (US); Gabrielle Chung, Santa Clara, CA (US); John Oliver Por, San Francisco, CA (US); Tarun Bansal, Bellevue, WA (US); Greg Duman Schechter, Los Angeles, CA (US); Allison Stanfield, Beaverton, OR (US); Anudeep Palanki, Sammamish, WA (US); Michael Blair Crouse, Seattle, WA (US); Frank Goodman, San Francisco, CA (US); Thomas Lukaszewicz, Manly (AU); Timothy Sohn, Los Altos, CA (US); Wilson Shih-Wei Sun, Shoreline, WA (US); Juan Alberto Mojica, Alhambra, CA (US); Duncan Andres Mercer, Orange, CA (US); Justin Gabriel Donnelly, Westlake Village, CA (US); Leonardo Jesus Peña, Marina Del Rey, CA (US); Jason Xia Hu, Santa Monica, CA (US); Lilyana Simeonova Mihalkova, Los Angeles, CA (US); Ji Young Lee, Sunnyvale, CA (US); Gabriel Mintzer Bender, Mountain View, CA (US); Behzad Golshan, Los Altos, CA (US); Bhavesh Sethi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 72 days.

(21) Appl. No.: 18/598,843

(22) Filed: Mar. 7, 2024

(65) Prior Publication Data

US 2024/0281481 A1 Aug. 22, 2024

Related U.S. Application Data

(63) Continuation of application No. PCT/US2024/016955, filed on Feb. 22, 2024.

(Continued)

(51) Int. Cl.
G06F 16/9532 (2019.01)
G06F 9/445 (2018.01)
G06F 16/957 (2019.01)

(52) U.S. Cl.
CPC ...... *G06F 16/9532* (2019.01); *G06F 9/44526* (2013.01); *G06F 16/9574* (2019.01)

(58) Field of Classification Search
CPC ............. G06F 16/9532; G06F 16/9574; G06F 9/44526

(Continued)

(56) References Cited

U.S. PATENT DOCUMENTS 7,451,152 B2 * 11/2008 Kraft ................... G06F 16/9535
707/999.102
8,655,872 B2 * 2/2014 Kraft ................... G06F 16/9535
707/723

(Continued)

OTHER PUBLICATIONS

Yang, Yi-Hsuan, et al., "ContextSeer: Context Search and Recommendation at Query Time for Shared Consumer Photos", MM '08, Vancouver, British Columbia, Canada, Oct. 26-31, 2008, pp. 199-208.*

(Continued)

*Primary Examiner* — Robert Stevens
(74) *Attorney, Agent, or Firm* — Brake Hughes Bellermann LLP

(57) ABSTRACT

A browser-based tool is disclosed for providing context-based assistance during web browsing. An example method involves receiving a contextual search request pertaining to main content displayed in a browser's display area, extracting content from the main content, receiving a contextual suggestion based on the extracted content, and displaying the contextual suggestion in a designated contextual search area within the browser. This innovative approach stream- (Continued)

lines the search process by providing users with relevant suggestions based on the content they are currently viewing, thereby improving efficiency in navigating online information.

25 Claims, 19 Drawing Sheets

Related U.S. Application Data

(60) Provisional application No. 63/486,451, filed on Feb. 22, 2023.

(58) Field of Classification Search
USPC .......................................................... 707/708
See application file for complete search history.

(56) References Cited

U.S. PATENT DOCUMENTS

| | | | |
|---|---|---|---|
| 10,204,163 B2* | 2/2019 | Gao | G06F 16/9535 |
| 11,860,958 B2* | 1/2024 | Lee | G06F 16/168 |
| 2002/0103789 A1* | 8/2002 | Turnbull | G06F 16/9536 |
| 2009/0083232 A1* | 3/2009 | Ives | G06F 16/951 |
| 2012/0158685 A1* | 6/2012 | White | G06F 16/9535 |
| | | | 707/723 |
| 2015/0169643 A1* | 6/2015 | Kogan | G06F 16/532 |
| | | | 707/E17.014 |
| 2016/0103876 A1* | 4/2016 | Bakir | G06F 16/9535 |
| | | | 707/722 |
| 2021/0365521 A1 | 11/2021 | Yusuf et al. | |
| 2022/0107802 A1* | 4/2022 | Rao | G06F 16/907 |

OTHER PUBLICATIONS

Feild, Henry, et al., "Task-Aware Query Recommendation", SIGIR '13, Dublin. Ireland, Jul. 28-Aug. 1, 2013, pp. 83-92.*

Rossiello, Gaetano, et al., "Workflow", Open Computer Science, vol. 9, Issue 1, © 2019, published by De Gruyter, pp. 212-225.*

Bossetti, Gabriela, et al., "ANDES: An approach to embed search services on the Web Browser", Computer Standards & Interfaces, vol. 82, Article 103633, Aug. 2022, Elsevier / Science Direct, pp. 1-17.*

"Document Object Model", Wikipedia, downloaded from: https://en.wikipedia.org/wiki/Document_Object_Model, Jul. 8, 2025, pp. 1-8.*

International Search Report and Written Opinion for PCT Application No. PCT/US2024/016955, mailed on Aug. 29, 2024, 13 pages.

* cited by examiner

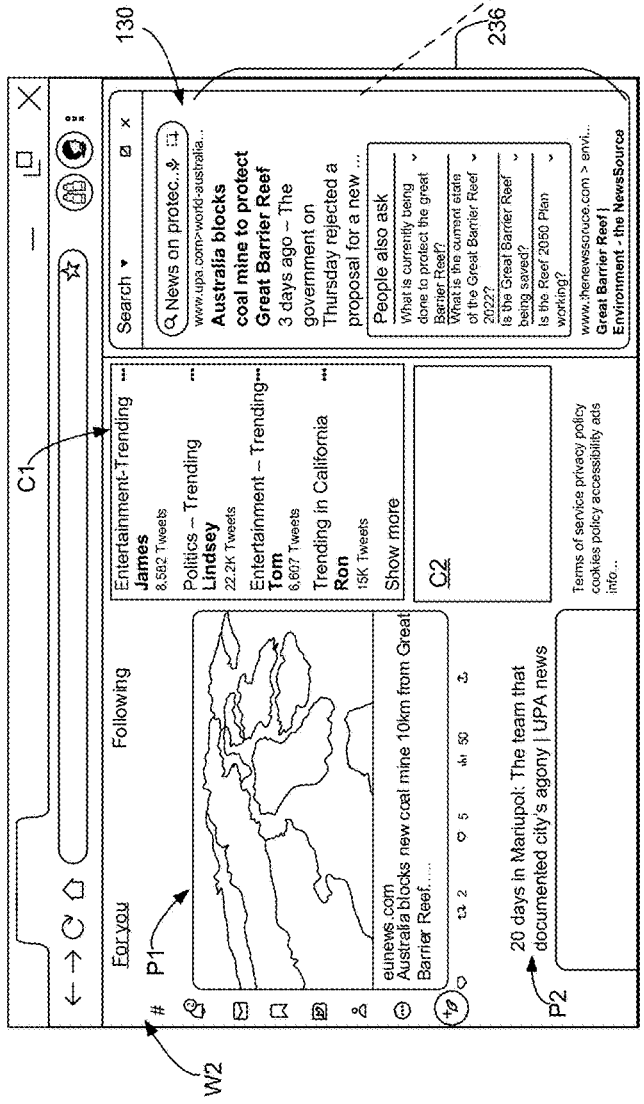
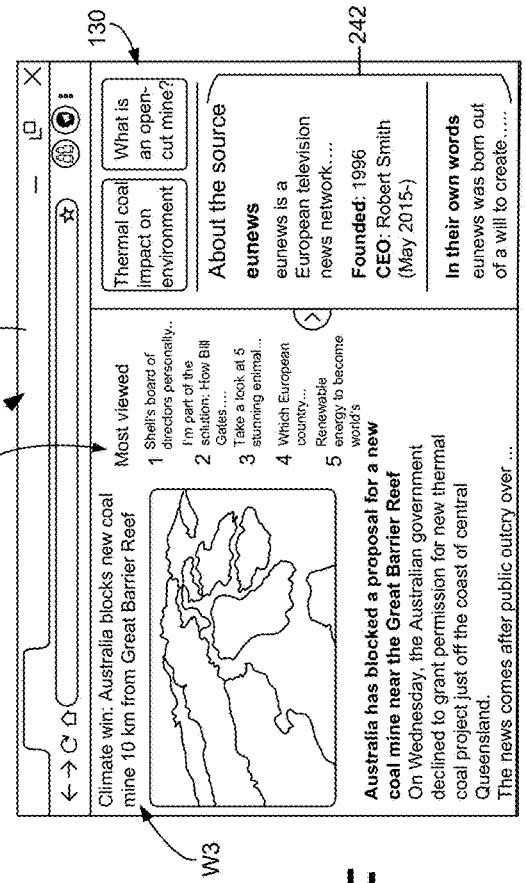
FIG. 2E
FIG. 2F

CONTEXTUAL SEARCH TOOL IN A BROWSER INTERFACE

RELATED APPLICATIONS

This application is a continuation of PCT Application No. PCT/US24/16955, filed Feb. 22, 2024, which claims priority to U.S. Provisional Application No. 63/486,451, filed Feb. 22, 2023, the disclosures of which are incorporated herein by reference.

DISCLOSURE

Websites provide information or functionality helpful to users and many users use the Internet to research products, places, companies, services, view social media or new feeds, etc.

SUMMARY

Implementations relate to a tool integrated into the browser that can provide additional context for main content, suggest content related to main content, summarize main content, etc., without navigating away from the main content. Main content is content for a resource, e.g., a webpage, a document, an image, etc., fetched by a browser. Main content is associated with a location (e.g., a URL) and a content provider. The main content may be content visible in the viewport of the browser. In some instances, main content may also include content of the resource not visible in the viewport. The contextual search tool provides the contextual content, suggested content, or summarized content in a search area of the browser, which enables a user to explore information about the main content without navigating away from the main content. The search area remains under the control of the browser and is not accessible to the provider of the main content. Implementations may extract at least some content from the main content. Implementations may use the extracted content to provide contextual search suggestions. Implementations may use the extracted content to provide generated content relevant to the main content. Implementations may use the extracted content to identify entities to provide additional contextual information on. The extracted content may be referred to as core content.

According to one aspect, the techniques described herein relate to a computer-implemented method, including: receiving a contextual search request relating to main content, the main content being displayed in a display area of a browser; extracting at least some content from the main content; receiving a contextual suggestion associated with the at least some content; and as a response to the contextual search request, causing display of the contextual suggestion in a contextual search area within the browser.

According to one aspect, the techniques described herein relate to a computer-implemented method, including: receiving a contextual search request for main content, the main content being displayed in a display area of a browser; receiving a prompt input; extracting content from the main content; receiving generated content based on the prompt input and the extracted content; and causing display of the generated content in a contextual search area that is within the browser.

The details of one or more implementations are set forth in the accompanying drawings and the description below. Other features will be apparent from the description and drawings.

BRIEF DESCRIPTION OF THE DRAWINGS

FIG. 2E is a diagram illustrating a contextual search area with a result of a contextual search query selected in FIG. 2D.

FIG. 2F is a diagram illustrating an updated display area and an updated contextual search area generated in response to selection of a search result in the contextual search area of FIG. 2E.

DETAILED DESCRIPTION

Figure 1A:
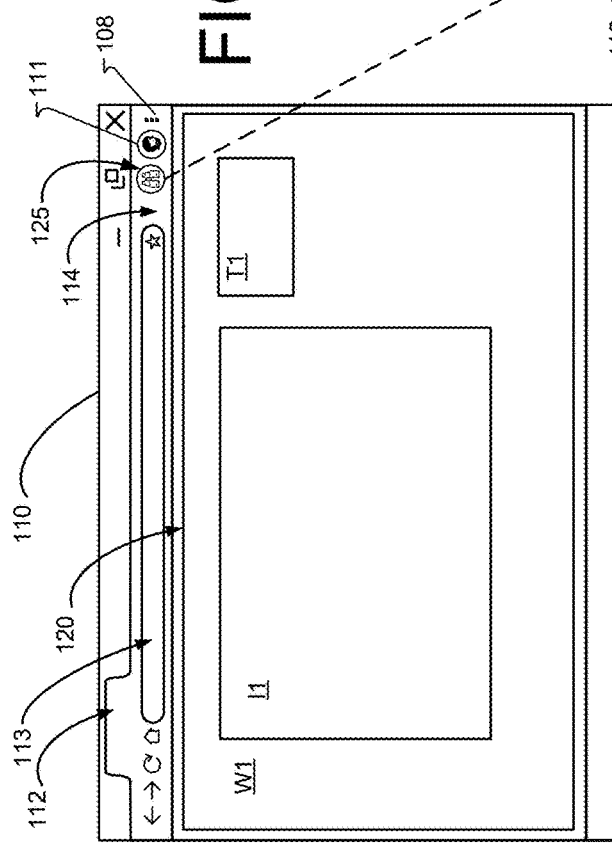
FIGS. 1A and 1B are diagrams that illustrate initiation of a contextual search tool in a contextual search area for content displayed within a display area of a browser, according to an implementation.

This disclosure is related to a browser tool that provides relevant search suggestions, contextually relevant content, and/or an interface for researching content associated with a resource (e.g., webpage) displayed in a display area of the browser. The contextual search tool can be displayed within a contextual search area of the browser, so that the content of a webpage is maintained (e.g., persists) in the browser. The contextual search tool is interactive and can enable a user to access contextually relevant information about the webpage. At least one of the search suggestions in the contextual search area can be selected, and search results for the selected search suggestion can be displayed in the contextual search area while the content in the display area is maintained. Thus, the contextual search tool enables a user to perform context related search tasks (checking on prices or reviews of a product, checking restaurants, hotel availability, or points of interest for a place, viewing a cast list while reading a movie review, etc.) without leaving (navigating away from) the main content. The browser can be referred to as a browser window when associated with a window of an operating system (OS).

At least one technical problem with browsing main content of a resource is that a user may have questions about the content but may not want to leave the content, either by opening a new tab or by navigating away from the resource, to find answers. At least another technical problem is that when the user leaves the content (e.g., by opening a new tab or navigating away from the content), there is no context for the browser to assist the user in identifying additional information that answers the question. At least one technical solution provided by the contextual search tool is that the tool aids users in finding the right information by making it easier to dive deeper and find answers via intelligent page content understanding and intelligent content generation. Put another way, the tool combines multiple functionalities in one place and uses intelligent understanding of the text and/or images in main content to help a user answer questions, understand content, and discover new information. The content of a resource is maintained (e.g., persists) in the browser in a separate display area while the contextual search tool, including suggested searches, search results, and contextual information are displayed. At least one technical effect of the tool is a reduction in the number of interactions a user has with the browser to navigate to different resources and submit different queries. At least another technical result is to present generative content related to the main content to aid in understanding a resource.

In some implementations, a contextual search area can be integrated as part of the browser so that the contextual search area may not be spoofed (e.g., imitated) by a third party or the owner of the webpage content. This can be implemented as a security feature so that a user can distinguish legitimate contextual search content provided by the contextual search tool from other content, including search results, that can be inserted by a third party or by the provider of a webpage or other resource. Accordingly, the technical problem of spoofing content can be obviated by the technical solution of integrating a contextual search area within the browser. The technical effect of integration of a contextual search area within a browser is that spoofing can be prevented and/or more easily recognized by the user.

The implementations described herein enable improved guided human-machine interactions for viewing webpages and other resources on the one side and displaying contextually relevant information on the other side. In some implementations, the contextually relevant information changes as the user scrolls the main content in the display area. The viewing of a webpage and the contextual information that helps a user understand and/or explore the content of the webpage are done simultaneously by using one user interface only. This results in fewer interactions of the user with the user interface as the user may easily conduct a search, find and view relevant information about content while simultaneously viewing the content.

Implementations include a core content extractor that scrapes the main content, e.g., by examining the document object model (DOM) tree for the main content and/or the accessibility tree for the main content, to identify core content. The core content may thus represent at least some content extracted from the main content, or in other words, extracted content. The core content includes text. The core content can include text and/or images represented in the main content. In some implementations, the core content extractor can be a machine-learned extraction model. The core content extractor can be configured to exclude certain types of information from the core content. For example, excluded content may include user information, sensitive information, third-party information (e.g., content supplied by an entity that is not the content provider, such as ads), etc. For example, the extraction model can be trained to recognize and exclude user information, sensitive information, third-party information, etc.

Implementations use the extracted core content to provide contextual suggestions. The contextual suggestions can include contextual search suggestions. The contextual search suggestions can include an image search based on an image and/or a portion of an image identified in the main content. The contextual search suggestions can include a search for a product or category of product identified using the core content. The contextual search suggestions can include a search for additional information about an entity identified in the main content. The contextual search suggestions can include a name of the entity identified in the core content. The additional information can include user-generated content (e.g., reviews, ratings). The additional information can include news about an entity. The contextual search suggestions can include other searches deemed relevant, such as queries related to the provider of the main content (e.g., based on a URL or a portion of a URL), queries related to content included in the displayed resource but not currently in the viewport, queries for which the main content is deemed responsive, and/or any other queries generated by a contextual query generator.

The contextual search suggestions may be actionable. In other words, a contextual search suggestion may be associated with a selectable control, such as a link, a button, etc., that is configured to, when selected, submit (send) the query to a search engine. Thus, when a contextual search suggestion is selected, implementations initiate a search with a search engine and provide the search results in the contextual search area. Thus, the contextual search tool enables a user to browse informational sources about main content without navigating away from the main content. In some implementations, the contextual search tool may be iterative. For example, selection of a search result presented in the contextual search area may change the main content, e.g., causing the browser to navigate to the resource identified in the search result and displaying the content of the new resource in the content display area. Having done so, this content becomes the main content, which may be provided to the content extractor, which identifies core content and displays contextual search suggestions in the search area of the browser.

Implementations may use the extracted core content to provide generated content relevant to the main content as a contextual suggestion. For example, the extracted core content may be provided to a generative (large) language model. The generative language model may provide one or more summaries about one or more entities identified in the main content. The generative language model may provide a summary of a large section of text in the main content. The generative language model may provide creative content related to the main content (e.g., generated math problems for a webpage discussing math problems, a generated poem for a discussion of writings in iambic pentameter, a suggested dinner menu for an invitation website, etc.) and the like. The generated content can be any content generated by a generative language model based on the core content. The generated content can be any content generated by a generative language model based on the core content and a prompt. The generated content can include some level of creativity, or in other words include content that is not factual content. In some implementations, the contextual search tool may include a dialog input area. The dialog input area may enable a user to pose questions to a generative (large) language model about the main content, or about any topic, in the form of a prompt input. The generative language model may use the core content, i.e., the content extracted from the main content, as part of the dialog context. This may enable the generative model to increase the relevancy of the generated responses. In some implementations, preference information may also be provided as part of the dialog context. In such implementations, the generative language model may use the preference information, the core content and/or a prompt input to provide the generated content.

Implementations may use the extracted core content to identify entities to provide additional contextual information on as part of a contextual suggestion. For example, implementations may use a model to predict an entity identified in the core content and to provide, e.g., information about the entity from an entity repository, etc. Implementations may use the core content to provide information on entities related to the core content. For example, for main content about a tourist attraction (such as the Eiffel tower) implementations may provide generated content listing nearby hotels and/or restaurants, etc. As another example, for main content about a product, implementations may provide generated content describing related products or suggesting locations to purchase the product. Some implementations may provide a category of related entities as a suggested search. For example, a suggested search of "nearby restaurants" may be provided for main content relating to the Eiffel tower or a suggested search of "related products" may be suggested for main content related to a product.

In some implementations, the contextual search tool brings together multiple search tools. For example, the contextual search tool may bring together a multimodal search box and an image region search in a single user interface. Some implementations may also include one or more of the contextual suggestions in the single user interface. Contextual suggestions can include contextual search suggestions (queries) that are queries related to the core content. Some contextual suggestions can include generative content related to the core content. Contextual suggestions may include page summaries. The page summaries can be generated by a language model based on the core content. Some implementations may also include a dialog input area in the single user interface.

The contextual search tool includes a novel user interface and new browser functionalities. The novel user interface helps users organize, understand, and take action on Internet-based documents. In particular, the contextual search tool includes intelligence (i.e., one or more machine-learned models) that extracts core content from a resource (e.g., a website) and uses that core content in combination with a search service to get answers in context without navigating away from the original resource. The tool enables a user to find information with fewer resources (fewer provided inputs and less navigation). The contextual search tool can be surfaced in multiple ways and can be presented with varying levels of detail.

The browsers described herein can be executed within a computing device. For example, the browsers can be executed within a laptop device. In some implementations, the browsers can be executed within a mobile device. or on any other device with limited available screen space. Although many of the implementations shown and described herein are shown in landscape mode, any of the implementations described herein can be rendered in portrait mode. Likewise, implementations described herein in portrait mode can be rendered in landscape mode.

Figure 1B:
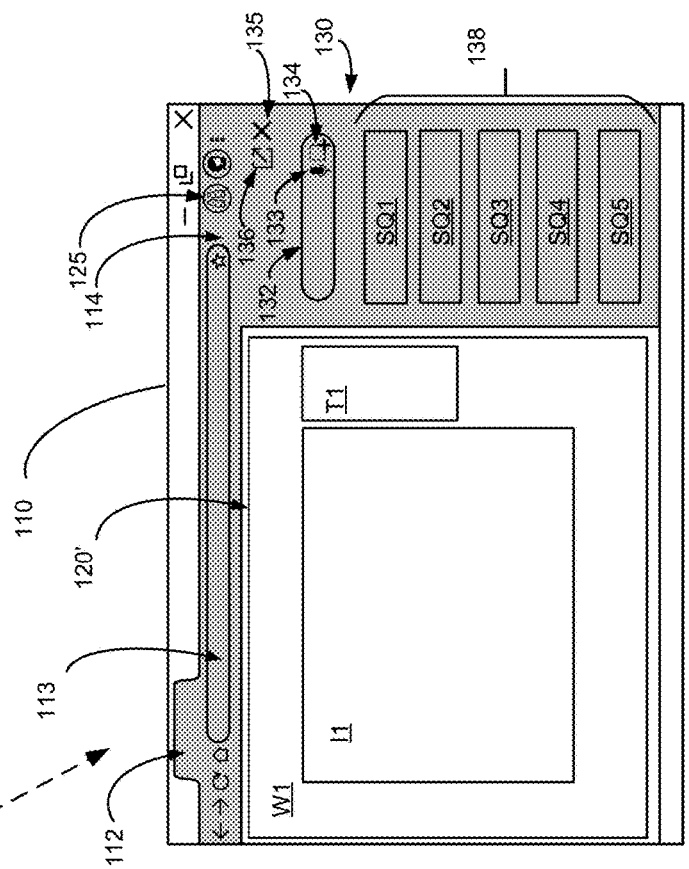

FIGS. 1A and 1B are diagrams that illustrate initiation of a contextual search tool in a contextual search area for content displayed within a display area of a browser, according to an implementation. FIG. 1A is a diagram that illustrates a browser 110 displaying a resource W1 within a display area 120 of the browser 110. In some implementations, the display area 120 can be within a tab 112 of the browser 110. The browser 110 includes an address bar area 114. An address of the webpage W1 can be displayed in the address bar area 114 (e.g., input address area 113). The address bar area may include a user icon 111 representing a profile of a user associated with the browser window. In some implementations, the browser 110 may include tool icon 125. The tool icon 125 may be a selectable control configured to open and display the contextual search tool. A request to open and display the contextual search tool may be considered a contextual search request. Although illustrated in the address bar area 114, the tool icon 125 may be located anywhere in the address bar area 114, including in the input address area 113. Other controls, icons, and/or so forth can be included in the address bar area 114. The address bar area 114 can be controlled by and/or associated with the browser 110 (e.g., the browser application). Because the address bar area 114 is controlled by the browser 110, the webpage W1 and/or a provider of the webpage W1 does not have access to content displayed in the address bar area 114 or triggering actions provided by actionable elements of the address bar area 114.

In response to selection of the tool icon 125, the browser 110 may be configured to display a contextual search area 130 within the browser 110, as illustrated in FIG. 1B. In the example of FIG. 1B, the address bar area 114 of the browser 110 and the contextual search area 130 may be part of a contiguous area. Put another way, the browser can render the contextual search area 130 as part of the browser-controlled address bar area 114. This contiguous area (e.g., combined address bar area 114 and contextual search area 130) can be referred to as a browser search area. The browser search area is illustrated in FIG. 1B by the gray color that is contiguous between the address bar area 114 and the contextual search area 130.

The contextual search area 130 can be integrated as part of the browser 110 (e.g., address bar area 114) in the browser search area so that the contextual search area 130 may not be spoofed (e.g., imitated) by, for example, a third party or the owner of the content of the webpage W1 content. Because the contextual search area is under control of the browser, the contextual search area is distinct from the display area. Because the contextual search area 130 is part of the application of the browser 110, the integration of the contextual search area 130 would be difficult to imitate by a provider of the content shown in the display area or another party not affiliated with the browser 110 (a third party). In some implementations, no clear separation (e.g., no separate line exists between the contextual search area 130 and the address bar area 114. Because the contextual search area 130 and the address bar area 114 are contiguous, any background or theme applied to the address bar area 114 would flow into (and would be contiguous with) the contextual search area 130 (as illustrated by the gray area). The contiguous background would be difficult for a third party (e.g., provider of the webpage W1) to imitate within an application of the browser 110. Moreover, the browser search area can be implemented as a security feature so that a user can distinguish legitimate search results provided by a search engine in response to a query from search results that can be inserted or manipulated by a third party or by the provider of the webpage.

Although not shown in FIG. 1B, in some implementations, the contextual search area 130 is separated from the address bar area 114 by a visible separation line between the address bar area and the contextual search area 130. The line can be eliminated (e.g., omitted), for security purposes. When provided, this is a line that a third party (e.g., provider of the webpage W1) may not remove (e.g., paint over, scrub out) the line. In other words, when provided, this is a line that is controlled (e.g., provided by, eliminated by) the browser 110 (e.g., browser application), similar to the address bar area 114.

The combining of the contextual search area 130 and the address bar area 114 can be an indicator of the authenticity of the content in the contextual search area 130. When the contextual search area 130 and the address bar area 114 are combined, it signifies that the browser 110 (or provider of the browser 110) is providing the contextual search suggestions 138 in the contextual search area 130. In some implementations, when a separating line is present between the contextual search area 130 and the address bar area 114, results in the contextual search area 130 may be provided by an untrusted provider (e.g., a third party).

In some implementations, the contextual search area 130 can be triggered in response to selection of a menu option, e.g., from a menu displayed in response to selection of more options icon 108. The triggering of the contextual search area 130 is a contextual search request. In some implementations, the contextual search area 130 can be triggered in response to selection of a menu option for a content item, such as a menu option displayed in response to right-clicking or long-pressing a word in text T1 or an image I1. In one example, the user may have selected the tool icon 125 of FIG. 1A. Thus, in response to interaction with the tool icon 125 in FIG. 1A (i.e., in response to a contextual search request), the webpage W1 is displayed within the display area 120' in FIG. 1B. Also in response to the selection of the tool icon 125 in FIG. 1A (i.e., in response to a contextual search request), the contextual search area 130 is also rendered within the browser 110 in FIG. 1B. Accordingly, in response to the selection of the tool icon 125 in FIG. 1A, as illustrated in FIG. 1B, both the webpage W1 is displayed within the display area 120' and the contextual search tool interface is rendered in the contextual search area 130 within the browser 110. Display area 120' differs from display area 120 of FIG. 1A in size. In other words, display area 120' occupies less area on the display than display area 120 to make room for contextual search area 130 but is otherwise the same as display area 120. Consistent with the description above, rendering of the contextual search area 130 in FIG. 1B can also be triggered in other ways, for example via a menu option.

As shown in FIG. 1B, in some implementations, the contextual search tool interface can include a pop out control 136. The pop out control 136 may be a selectable control configured to, in response to being selected, cause the content currently displayed in the contextual search area 130 to replace the main content of W1 in the display area 120 and close the contextual search area 130. In some implementations, the contextual search tool interface may include a close control 135. The close control 135 may be a selectable control configured to, in response to being selected, cause the browser 110 to remove (e.g., clear) the contextual search area 130. In some implementations, removal of (e.g., clearing) the contextual search area 130 automatically returns the display area 120' to display area 120. The UI design includes visual means to clearly separate the contextual search area 130 from the display area 120, such that the contextual search area 130 can be recognized as part of the intrinsic functionality and user interface of the browser, i.e. provided by the browser implementation, whereas content and a user interface shown in the content area 120 are obtained and rendered from external content which is, e.g. loaded in the form of a webpage from an external web server.

The contextual search tool interface may also include a search box 132. A user may initiate a query by typing the query into the search box 132. In some implementations, the search box 132 may act as a conversation input box. For example, some implementations may provide the input from the search box 132 to a generative language model, which provides a generated response to the input. In some implementations, the contextual search tool interface may include a voice input control 133. The voice input control 133 may be configured to, in response to being selected, cause the browser to receive a voice recording, convert the voice recording to text, and initiate a search using the text as the search query.

In some implementations, the contextual search tool may include a region search control 134. The region search control 134 may be configured to, in response to being selected, enable the user to select a portion of the content in the display area 120' and use the selected portion to initiate a query. Put another way, the region search control 134 may enable a user to select an image, a portion of the image, or a frame of a video from the webpage W1 and to initiate a search using the image. In some implementations, the region search control 134 may enable the user to define an initial image search and the search box 132 may be configured to enable the user to further define the image search. For example, if a region of the content of W1 is selected, the search box 132 may show an image of the selected content. In this example, the search box 132 may include a refinement control that enables the user to crop the initial image (e.g., the region originally selected) and submit a follow-on query. Search results from a query submitted (sent to a search engine) in the search box 132 are displayed in the contextual search area 130 and do not replace the main content (the content of W1) in the display area 120'.

As is known, a search result page is generated by a search engine in response to a query. The search result page includes search results and can include other content, such as ads, knowledge panels, short answers, other types of rich results including generated content, links to limit the search to a particular resource type (e.g., images, travel, shopping, news, videos, etc.). Each search result corresponds to a resource available via a network, e.g., via a URL/URI/etc. The resources were determined to be responsive to the query by the search engine. The search result includes a link to its corresponding resource. The search result can include additional information, such as a title, a snippet (text obtained from the content of the resource), an image associated with the resource, etc., or other information relevant to the resource and/or the query, as determined by the search engine. Conventionally, a browser displays the search result page in the display area. When a query is issued from the contextual search area 130, implementations may display the search results in the contextual search area 130 instead of the display area 120'. In some implementations, the content of a search result (the kind, length, etc.) may be different based on a query submitted via the contextual search area 130 than from a search engine home page or the input address area 113. In some implementations, a ranking of the search results in a search result page may differ based on the query being issued from the contextual search area 130 and/or with the core content. Put another way, in some implementations, the search engine may use the core content in ranking results.

In the example of FIG. 1B, the contextual search area 130 includes contextual search suggestions 138. The contextual search suggestions 138 represent queries relevant to the content of webpage W1. Put another way, the contextual search suggestions 138 represent queries selected by the contextual search tool as relevant and/or helpful for understanding or discovering additional information about the main content displayed in display area 120'. The contextual search suggestions 138 are determined using core content extracted from the main content, i.e., the content of webpage W1 of FIG. 1A. In some implementations, the contextual search suggestions 138 are determined prior to receiving a user-provided query. Put another way, in some implementations, an initial contextual search area 130 may include suggestions for a user's search determined based on the core content without user-provided input. In some implementations, although not shown in FIG. 1B, additional contextual search suggestions 138 may be viewed via scrolling the contextual search area 130.

In some implementations, the core content is identified by analyzing the document object model (DOM) for the main content. In some implementations, the core content is identified by analyzing an accessibility tree for the main content. In some implementations, the core content is identified by analyzing the DOM and the accessibility tree for the main content. In some implementations, the core content is non-third-party content. For example, advertisement content may be excluded from the core content. In some implementations, user input is excluded from the core content. For example, if the main content includes any input controls (e.g., text boxes, drop-down boxes, etc.) the content associated with the input controls may be excluded from main content. In some implementations, sensitive content may be excluded from core content. For example, content that is adult content or content related to financial information (e.g., a website listing bank account information) may be excluded from core content. In some implementations, user content may be excluded from core content. For example, user birthdates, names, identifiers, etc. may be excluded from core content. In some implementations, a machine-learned model may be used to identify the core content. For example, a DOM and/or an accessibility tree may be provided to the model and the model may determine the core content. The model is a model that runs on the client device. Thus, core content is determined on the client device.

Figure 1C:
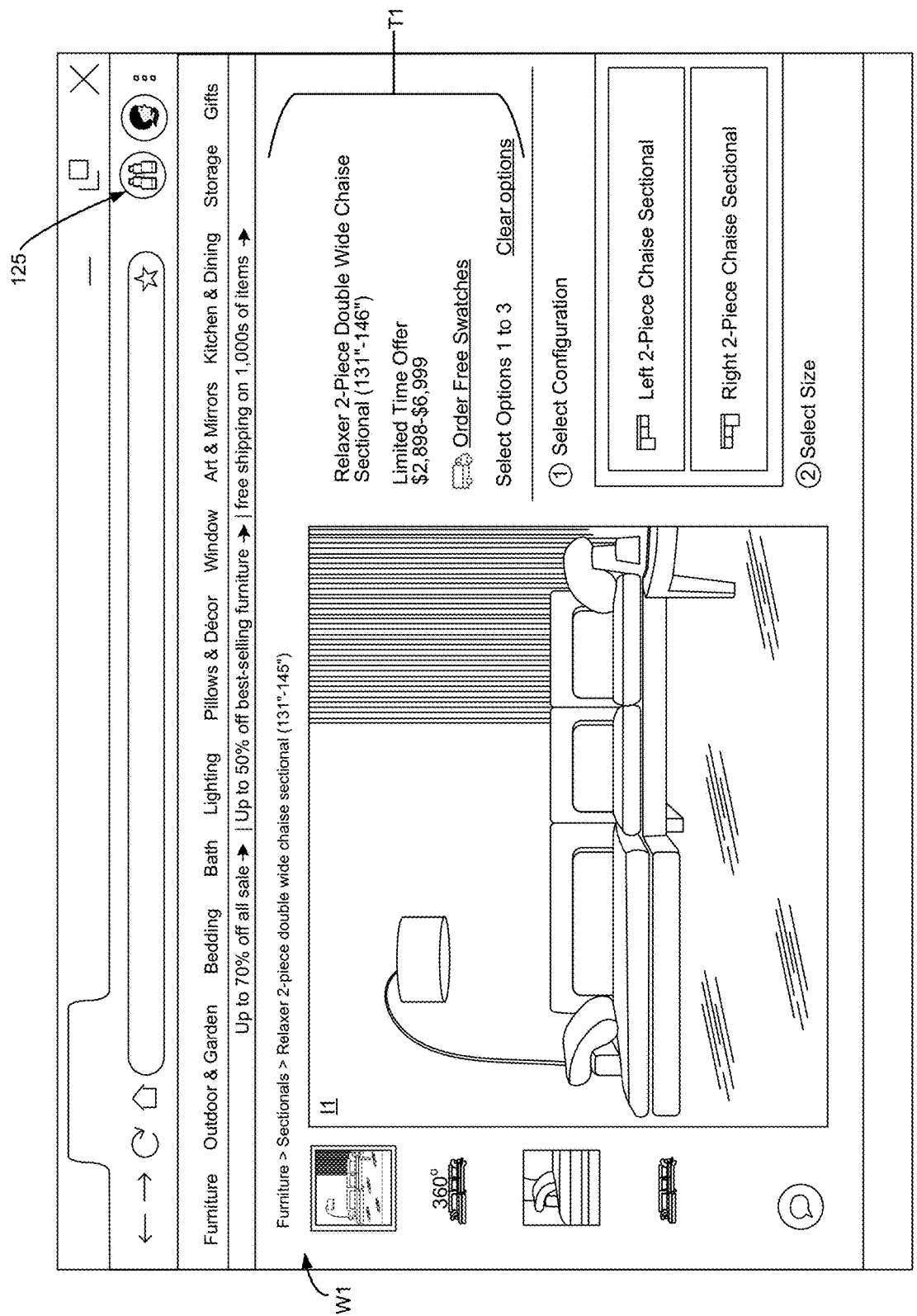
FIG. 1C illustrates example main content corresponding to FIG. 1A.
Figure 1D:
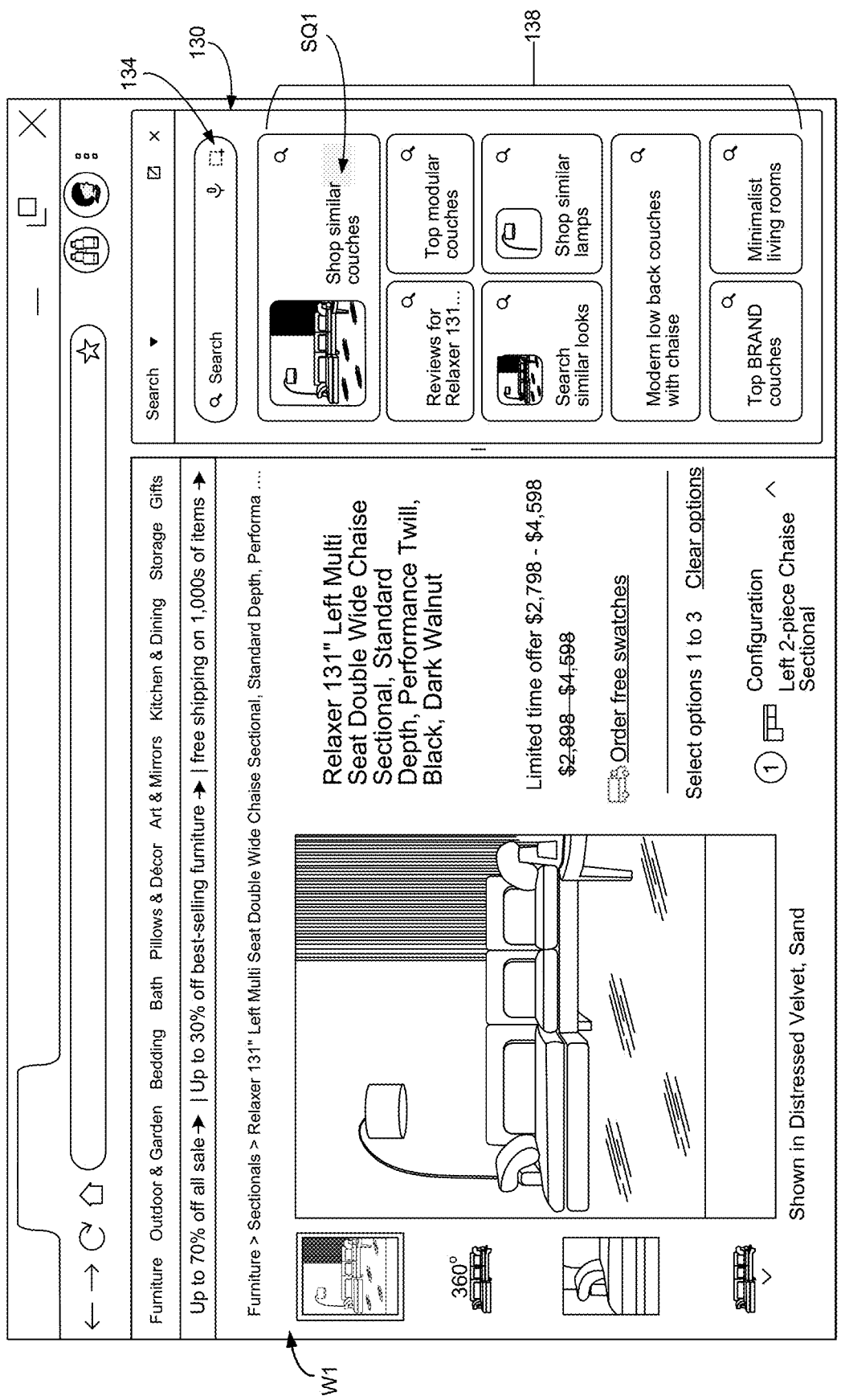
FIG. 1D illustrates an example contextual search area with example contextual search suggestions corresponding to FIG. 1B, according to an implementation.

FIG. 1C illustrates example main content corresponding to FIG. 1A. FIG. 1D illustrates an example contextual search area 130 with example contextual search suggestions 138 for the example main content of FIG. 1C. FIG. 1D may thus correspond to FIG. 1B. In some implementations, the contextual search area 130 of FIG. 1D may be generated by the browser 110 in response to selection of the tool icon 125 of FIG. 1C. In the example of FIG. 1D, various entities have been identified (in text and images of webpage W1) and the contextual search suggestions 138 are related to the entities. In addition, some searches are suggested based on images identified in the content of W1. Because the contextual search suggestions 138 and entities are determined without user input, one or more models may be used to determine which images and/or which portions of an image a user is most likely to use in a search given the page context (e.g., the core content). One or more models may be used to determine which entities a user is most likely to search on given the page context (e.g., the core content). In some implementations, the model(s) may consider one or more of the following factors: the size of an image, the content of an image, the category of the core content (e.g., product, hotel, restaurant, business homepage, blog, etc.), the URL of the resource, the file type, Exchangeable Image File Format of the image, text associated with the image (e.g., a caption and/or accessibility text added by the accessibility tree, a file path of the image, a relative location of the image in the viewport, a relative location of the image in the resource, a relative size of the image compared to other images in the page, a relative size of the image compared to other images in the page, whether the image is a hot-linked image (hosted at a site that is not the site of the main content), etc.

In the example of FIG. 1B, a suggested search SQ1 is a suggestion to find similar sofas. The sofa is identified in the image I1 of the webpage W1. Other suggested searches include a search of user-generated content (e.g., reviews) for a particular product mentioned in the content of the webpage W1. As another example, a suggested search includes a search for a category of sofa identified in the content of webpage W1. As another example, a suggested search includes a search of images with looks similar to I1. As another example, a lamp has been identified in image I1 and a suggested search includes a search for lamps similar to the identified lamp. Other example suggested searches are illustrated in FIG. 1D, all related to the main content in the display area 120'. The queries can be suggested by a query suggestion service in response to receiving the core content, as described in more detail with regard to FIG. 5. In some implementations, the suggested searches may be ranked (ordered) based on features of the core content. For example, the suggested searches may be ranked based on a category determined for the core content. As another example, the suggested searches may be ranked based on an anticipated user action or actions for the core content. As another example, the suggested searches may be ranked based on a category of an entity identified in the core content. As another example, the suggested searches may be ranked based on placement or prominence of an entity in the core content.

Figure 1E:
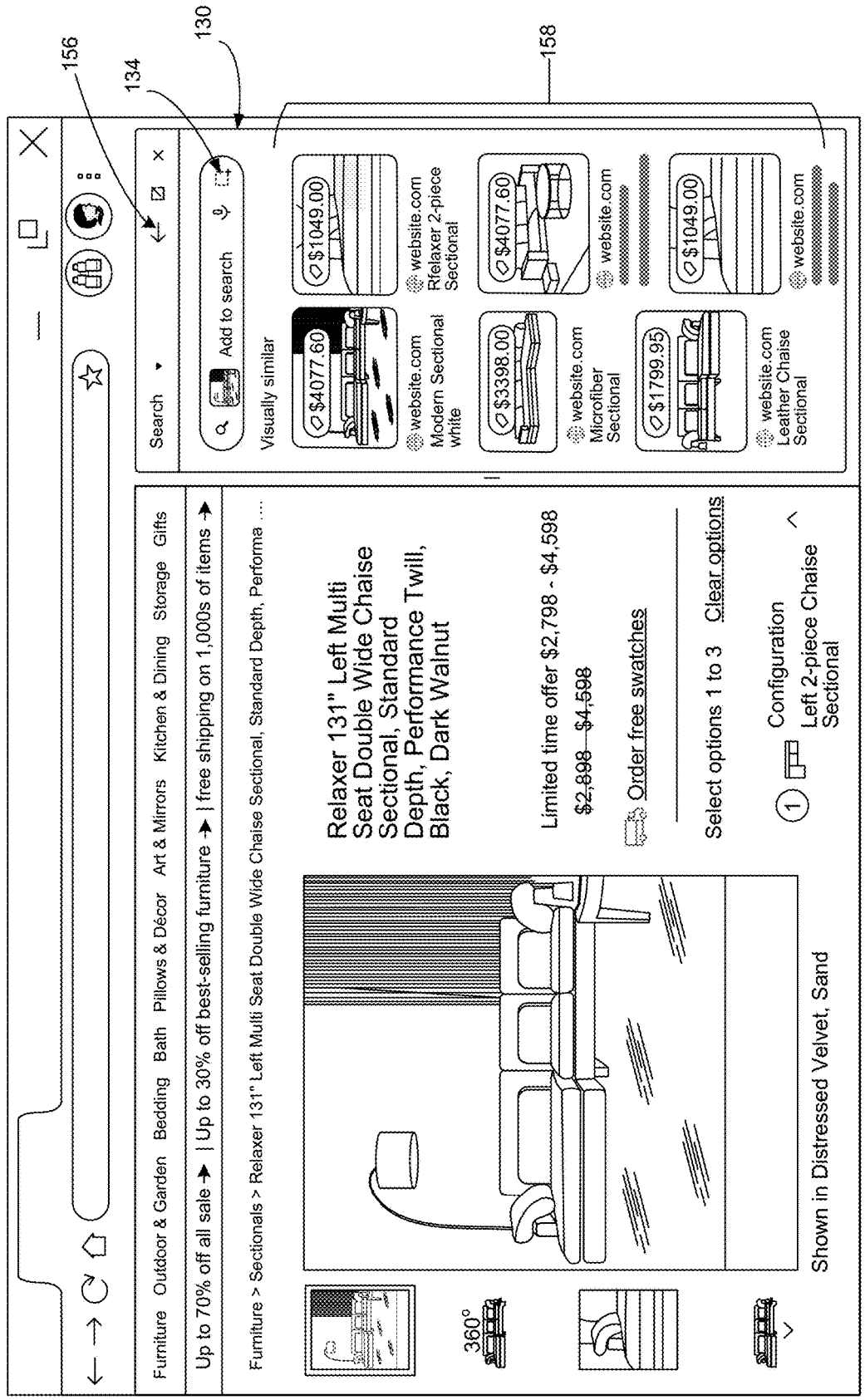
FIG. 1E illustrates an example contextual search area displayed in response to selection of SQ1 of FIG. 1D.

FIG. 1E illustrates an example contextual search area displayed in response to selection of SQ1 of FIG. 1D. Thus, FIG. 1E illustrates that a search initiated within the contextual search area 130 does not replace the content of the display area 120'. Instead, the contextual search suggestions 138 are replaced by search results 158. A back control 156 may cause the contextual search suggestions 138 to be rendered. Selection of one of the search results 158 may replace the webpage W1 with content represented by the resource associated with the selected search result. The content of a search result of the search results 158 may be based on a category of the resource.

Figure 1F:
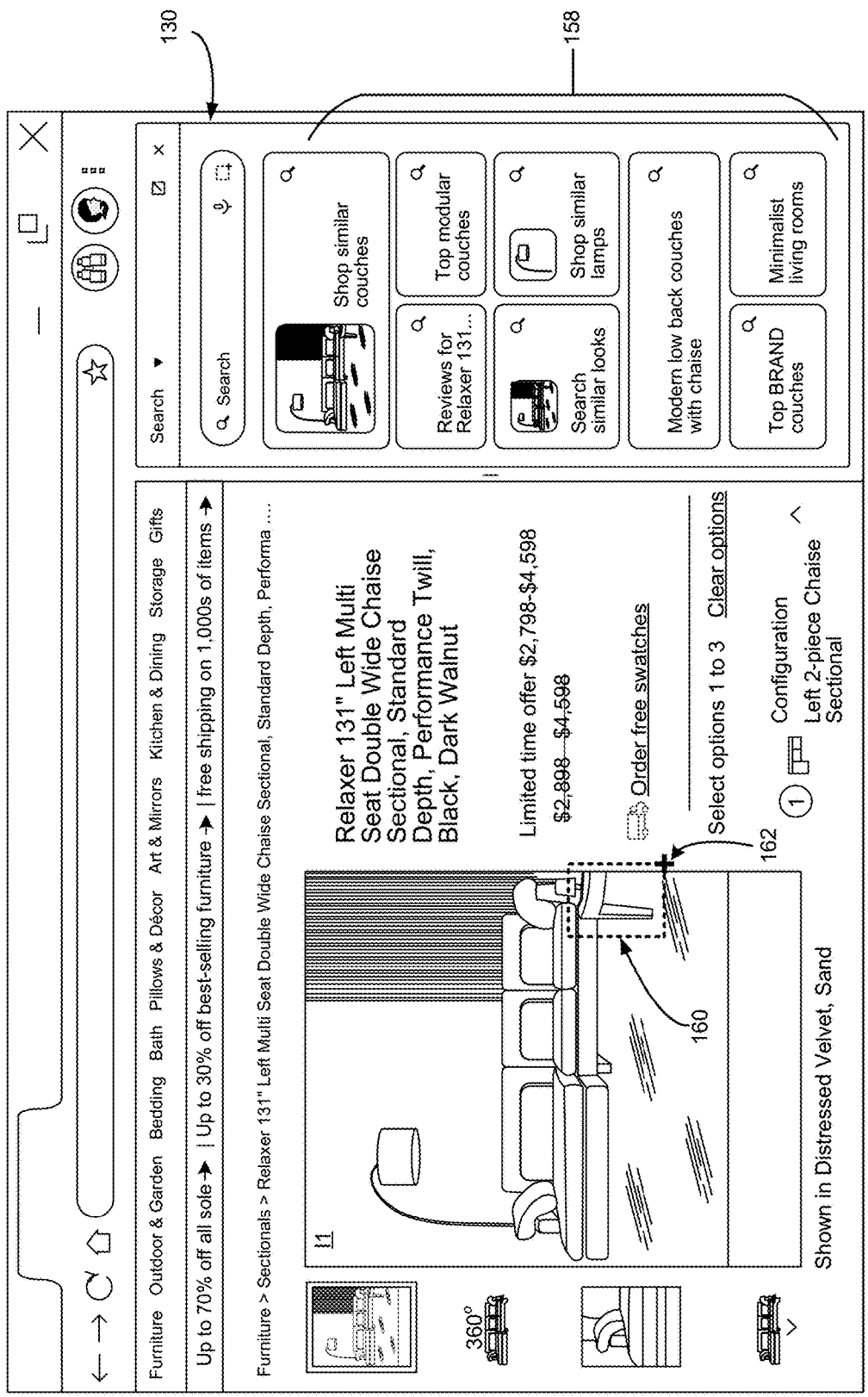
FIG. 1F illustrates an example browser interface displayed in response to selection of a region search control in FIG. 1D.

FIG. 1F illustrates an example browser interface displayed in response to selection of the region search control 134 in FIG. 1D. In response to selection of the region search control 134, the browser may enable the user to select a region of the main content (of webpage W1) via region selector 160. The region selector 160 may be any method of identifying a region of the main content. Although illustrated as a rectangular shape, the region selector 160 may be any shape, e.g., a circular shape, an oval shape, a triangular shape, or a free-form shape. In some implementations, a user may use a predetermined gesture to indicate what portion of the image to search. In one example, a user may place an input device (e.g., cursor, finger, stylus, etc.) in the main content and drag diagonally or draw a circle, oval, etc. to identify the region to be selected. In one example, the browser may put a default region selector 160 on a portion of the main content and the region selector 160 may have a size control 162 that changes a size of the region selector 160. The region selector 160 may be moved from one location to another. Any portion of the main content within the boundaries of the region selector 160 may be used as an image search.

Figure 1G:
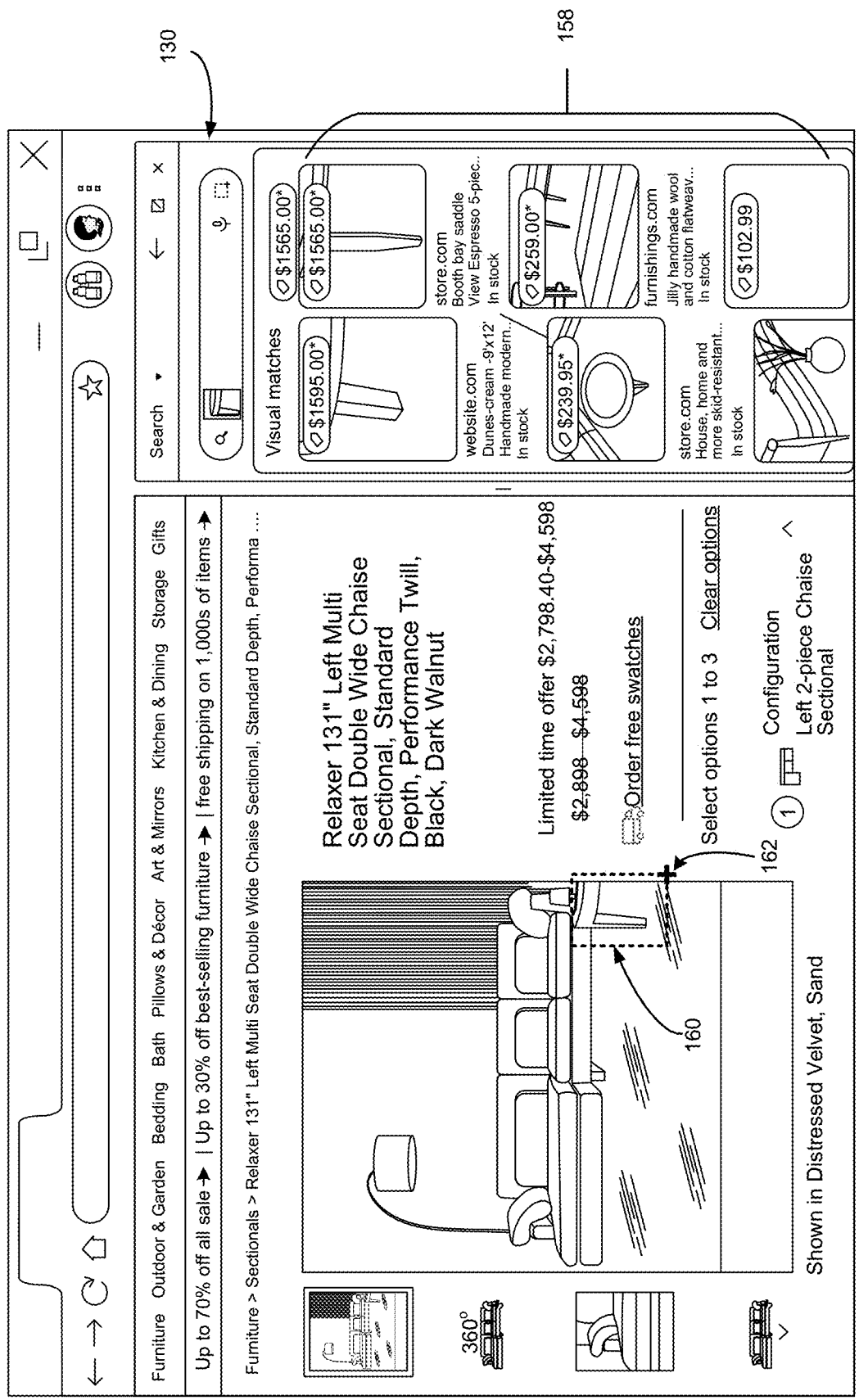
FIG. 1G illustrates an example browser interface generated in response to submission of the image search using the region selected in FIG. 1F.

In some implementations, the browser 110 may perform object segmentation on an image in the main content. In some implementations, the object segmentation may be performed in response to selection of the region search control 134. In some implementations, the object segmentation may be performed in response to presentation of the contextual search area 130, e.g., in response to selection of the tool icon 125. In object segmentation, the pixels in the image are assigned to a class. Each image may have multiple classes. Classes can correspond to a particular entity. Classes may not correspond to a particular entity, but the pixels may be understood to belong to the same type of thing (class). In such implementations, the browser may make the segments (the different classes) selectable, e.g., the segments may act as the region selector 160. For example, an object segmentation model may be used to analyze the image I1 of FIG. 1F. As a result, several object segments may be recognized, such as the lamp, the sofa, the floor, the curtains, and the table. Rather than having to click and drag the region selector 160 to select the table illustrated in FIG. 1F, a user may hover over the table and the browser 110, in response to detecting the hover input, may change an appearance of the region of the image I1 corresponding to the table. For example the browser 110 may change the appearance of the region so that a dashed line outlines the table. This outline may indicate that the portion of the image I1 represented by the table is selectable, e.g., as the region selector 160. In such an implementation, if the user selects (e.g., clicks/taps on) the portion of the image outlined in dashed lines, that portion of the image may be submitted as a query. FIG. 1G illustrates an example browser interface generated in response to submission of the image search using the region selected in FIG. 1F. In some implementations (not shown), query suggestions related to the region selector 160 may be provided in contextual search suggestions 138.

Figure 1H:
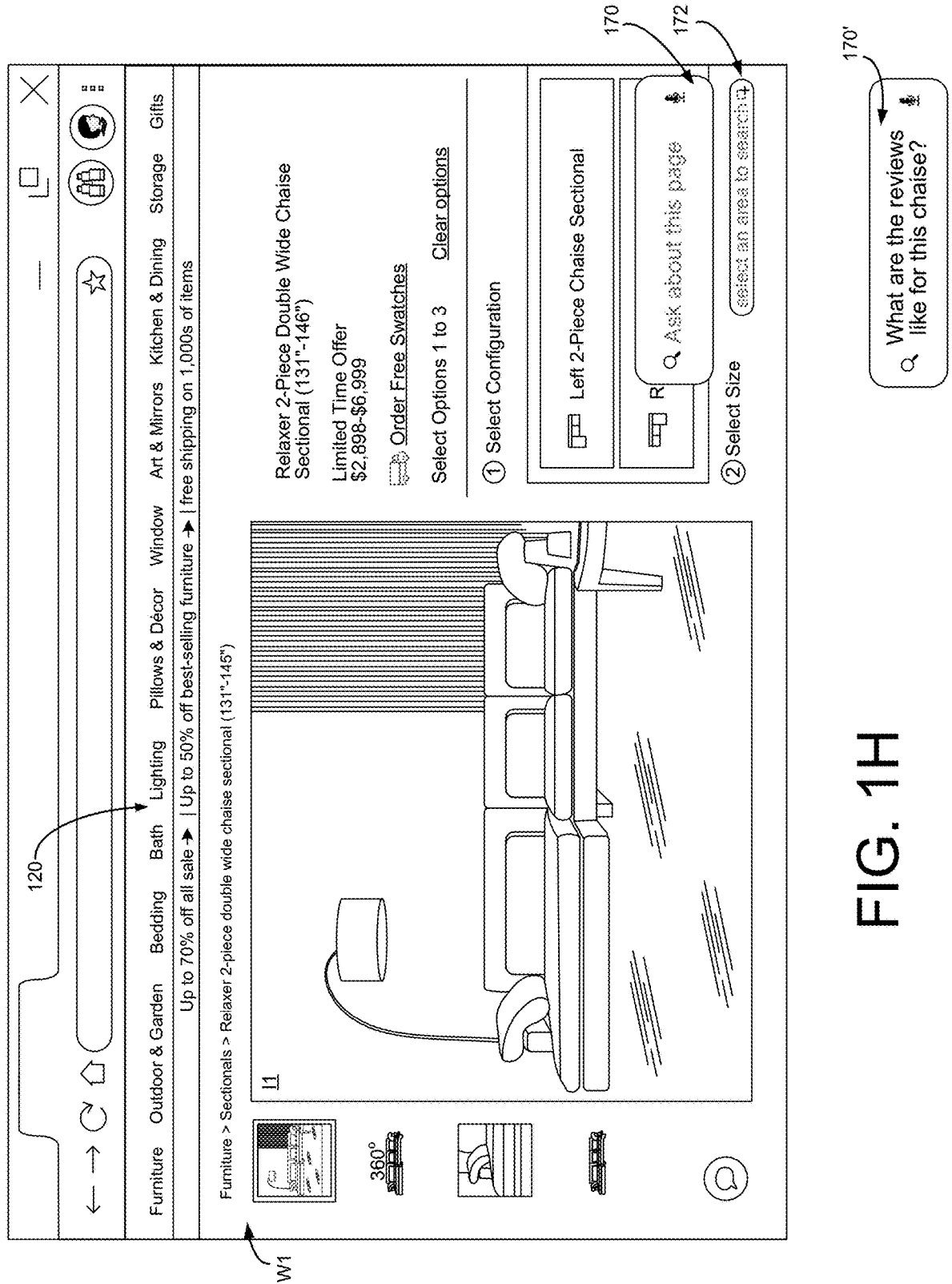
FIG. 1H illustrates an example browser interface with a condensed contextual search tool interface, according to an implementation.

FIG. 1H illustrates an example browser interface with a condensed contextual search tool interface (i.e., a condensed contextual search area) generated in response to initiation of the contextual search tool, as disclosed herein. For example, the condensed contextual search tool interface may be generated in response to selection of tool icon 125 of FIG. 1C, in response to a menu option, e.g., from selection of a menu generated in response to selection of more options icon 108, etc. Thus, the dialog input area 170 can be generated under any conditions where the contextual search tool is initiated. The condensed contextual search area may include a dialog input area 170. The dialog input area 170 provides the user an opportunity to provide a question about the main content of the webpage W1 prior to display of the contextual search area 130. Thus, dialog input area 170 is similar to the search box 132 described above, in that a user can type a query into the dialog input area 170. In some implementations, the query may provide a prompt into the dialog input area 170. In some implementations, the input into the dialog input area 170 may be considered a query and a prompt. In such implementations, search results may be determined for the input as a query and generated content may be returned for the input as a prompt. Dialog input area 170' illustrates an example of a prompt provided by the user as input. In some implementations, the dialog input area 170 may include a voice input control 133, as described above, for providing the prompt. In some implementations (not shown), the dialog input area 170 may include a region search control 134, as described above. In some implementations, the condensed contextual search area may include a region search instruction 172. The region search instruction 172 may provide the user with an indication that the user can select a region of the displayed main content of the webpage W1 for searching. The selection of the region can be done in any manner described with respect to FIG. 1F. This selected content may be provided to the contextual content engine. In some implementations, the selected content may be provided as a prompt input. In some implementations, this selected content may be provided in addition to a prompt input provided in the dialog input area 170. In some implementations, there is no region search instruction 172 and it is implied that a user can select a region of the displayed main content of the webpage W1. In some implementations, the contextual search tool may cause the browser to display a transparent overlay over the main content of the webpage W1 as part of the condensed contextual search area. The transparent overlay may be removed when a region is selected to indicate which portion of the main content has been selected for searching.

Figure 1I:
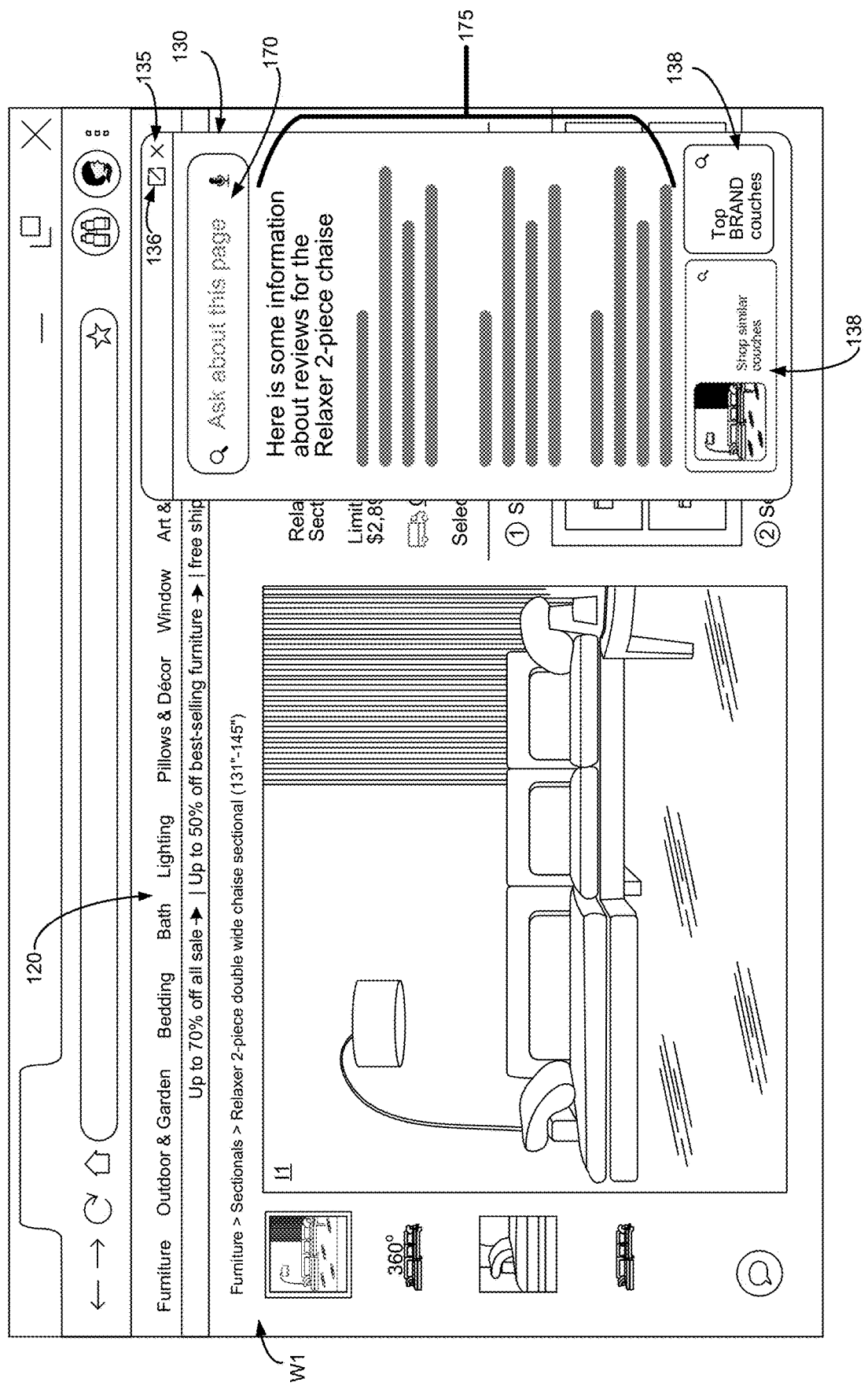
FIG. 1I illustrates an example contextual search area with example contextual content and contextual search suggestions generated from a prompt provided in FIG. 1H, according to an implementation.

FIG. 1I illustrates an example contextual search area with example contextual content and contextual suggestions generated from a prompt provided in FIG. 1H, e.g., as illustrated in dialog input area 170', according to an implementation. In the example of FIG. 1I, the contextual search area 130 may be an overlay interface. In an overlay interface the contextual search area 130 is still integrated as part of the browser 110 so that the contextual search area 130 may not be spoofed (e.g., imitated) by, for example, a third party or the owner of the content of the webpage W1 content. However, with an overlay interface some of the content of the webpage W1 is obscured by the contextual search area 130. Although the contextual search area 130 of FIG. 1I and the address bar area 114 are not contiguous, any background or theme applied to the address bar area 114 also flows into the contextual search area 130, so that it is clear the contextual search area 130 is associated with the contextual search tool provided by the browser and not with a content provider.

In the example of FIG. 1I, the contextual search tool has provided two contextual search suggestions 138. Additional contextual search suggestions 138 may be viewed, e.g., by scrolling the content in the contextual search area 130. In the example of FIG. 1I, the contextual search tool has provided search results 175. The search results 175 may include generated content. The generated content may be considered a contextual suggestion. For example, the prompt of dialog input area 170' may be provided to a generative language model with the core content extracted from the webpage W1. The prompt of the dialog input area 170' be denormalized before being processed by the generative language model or as part of being processed by the generative language model. Thus, for example, "this chaise" in the prompt (or query) may be denormalized to refer to the Relaxer 2-piece chaise offered for sale by the content provider of the webpage W1. In some implementations, the generative language model may return generated content as a contextual suggestion that reflects (summarizes) reviews for the Relaxer 2-piece chaise offered by the content provider of webpage W1. In some implementations, the content of actual reviews (e.g., top-rated, most helpful, most recent) reviews may be provided as the search results 175.

Although discussed in the context of a webpage W1, in some implementations, the content rendered in the display area 120' may not be a webpage. As discussed herein, the content may be associated with any resource accessible via a network or a resource saved on the user's device. Thus, in some implementations, the content displayed in the display area 120' can be in an image, a link, a video, text, a PDF file and/or so forth.

Figure 2A:
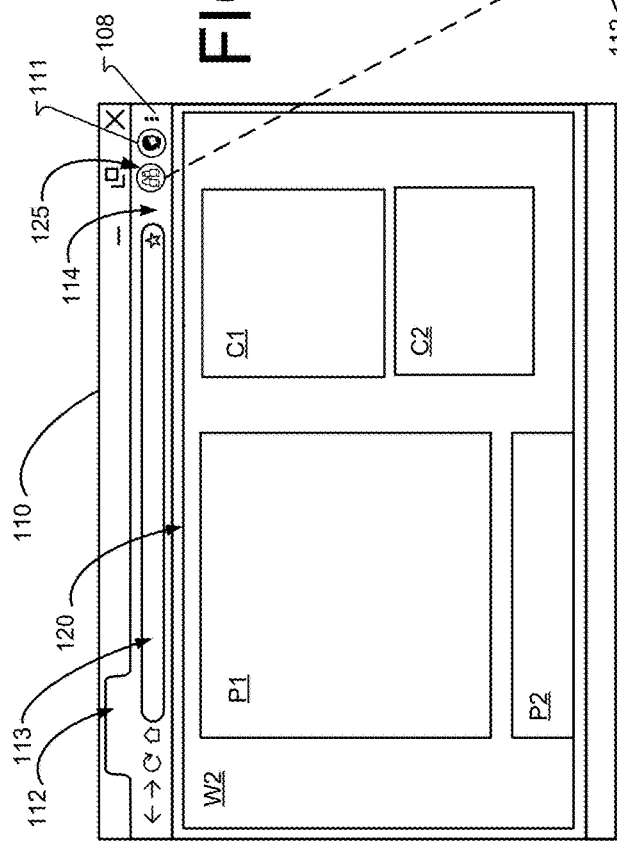
FIGS. 2A and 2B are diagrams that illustrate another variation of initiation of a contextual search tool in a contextual search area for content displayed within a display area of a browser, according to an implementation.
Figure 2B:
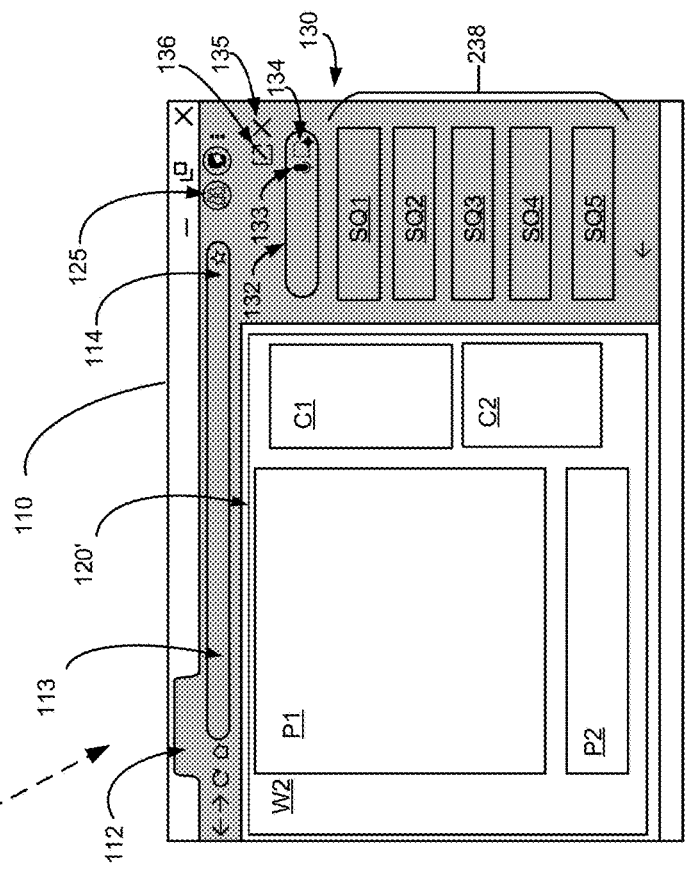

FIGS. 2A and 2B are diagrams that illustrate another variation of initiation of a contextual search tool in a contextual search area 130 for content displayed within a display area 120 of a browser 110, according to an implementation. In the example of FIG. 2A, website W2 is the source of the main content displayed in the display area 120 of the browser 110. The website W2 is a news source, e.g., a social media site, a news aggregation site, etc. The website W2 includes a post P1 and a post P2 in the viewable area (e.g., the display area 120), but only a portion of the post P2 is visible. The website W2 may have many additional posts not included in the display area 120. In some instances, the website W2 may be an infinite scrolling site. In other words, as a user scrolls down the website W2 may fetch additional posts, so that the user never hits an end of page. The website W2 may also have non-core content C1 and non-core content C2. The non-core content C1 and C2 may represent advertisements, suggestions, or other content that may or may not be related to the post P1 or the post P2. Non-core content C1 and C2 can be examples of content excluded from the core content extracted for website W2.

In response to a user selecting the tool icon 125, the browser may render the main content in display area 120' and render the contextual search tool in contextual search area 130, as described above. The controls of the contextual search tool are similar to those described with regard to FIG. 1B. The contextual search suggestions 238 may be similar to the contextual search suggestions 138. However, because the context of the content has changed, the contextual search suggestions 238 may differ in nature from the contextual search suggestions 138.

In some implementations, although not shown in FIG. 2B, additional contextual search suggestions 238 may be triggered via a scrolling input, e.g., scrolling or otherwise navigating through the main content in display area 120' in FIG. 2B. Put another way, the browser 110 may be configured to determine when the main content rendered in the display area 120' (the viewport) has changed (e.g., is 60% new, is 75% new, when a new post is fully rendered in the display, etc.) in response to a user action (a scrolling input) and trigger the contextual search tool, which may re-extract the core content and generate a new set of contextual search suggestions 238. In other words, as a user scrolls the posts of the webpage W2, the browser 110 may detect the scrolling input and may change the contextual search suggestions 238 in the contextual search area 130 to match the content currently displayed. In some implementations, this may include re-ranking and/or re-ordering the contextual search suggestions so that a contextual search suggestion not previously provided (or not previously in the viewport of the contextual search area 130) is visible. In some implementations, this may include re-determining (re-extracting) the core content and submitting a new request to the contextual content engine to receive new contextual search suggestions 238. In some implementations, this may include re-submitting the request to the contextual content engine with an indication of the core content that corresponds to the main content now in the viewport to receive new contextual search suggestions 238.

Figure 2C:
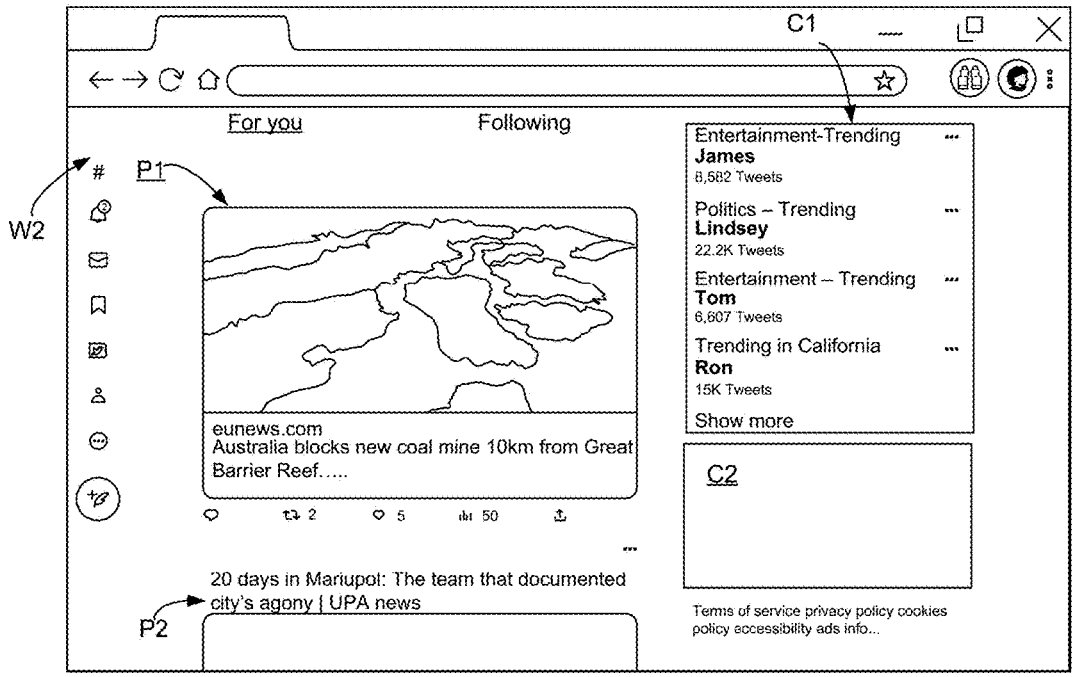
FIG. 2C illustrates example main content corresponding to FIG. 2A.
Figure 2D:
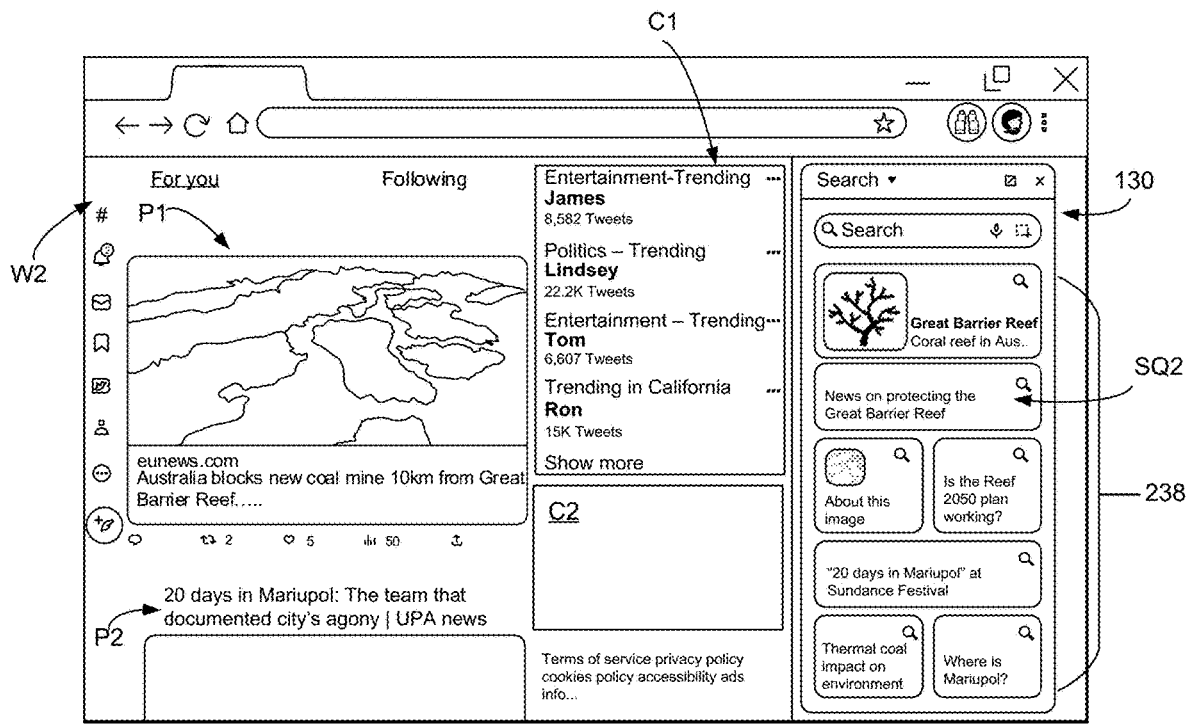
FIG. 2D illustrates an example contextual search area with example contextual search suggestions corresponding to FIG. 2B, according to an implementation.

FIG. 2C illustrates example main content for a webpage W2 corresponding to FIG. 2A. In the example of FIG. 2C, the content C1 is recommendation content generated by the provider of the website W2 and the content C2 may be an advertisement not generated by the provider of the website W2. Both C1 and C2 may be excluded from core content used to generate contextual search suggestions 238. FIG. 2D illustrates an example contextual search area 130 with example contextual search suggestions 238 corresponding to FIG. 2B, according to an implementation. The contextual search suggestions 238 differ in type from the contextual search suggestions 138 because the underlying core content differs.

FIG. 2E is a diagram illustrating a contextual search area with a result of a contextual search query selected in FIG. 2D. For example, a user may select the suggested search SQ2 of FIG. 2D and the browser may submit a query if "news on protecting the Great Barrier Reef" to a search engine. In response to receiving a search result for the query, the browser may display the search result page 236 in the contextual search area 130, as illustrated in FIG. 2E. Thus, the search result page 236 replaces the contextual search suggestions 238 with a search result page 236. In some implementations, the items in the search result page 236 may be different than those returned for the same query when the results are rendered in the display area 120 instead of the contextual search area 130 because the contextual search area 130 has less room for display than display area 120.

FIG. 2F is a diagram illustrating an updated display area and an updated contextual search area generated in response to selection of a search result in the contextual search area of FIG. 2E. In the example of FIG. 2E, webpage W3 replaces webpage W2 in the display area 120 because webpage W3 is the resource associated with the selected search result. In the example of FIG. 2F the contextual search area 130 is not closed, but is updated using the content of the webpage W3. In other words, in some implementations, the browser 110 may keep the contextual search area 130, extracting the core content of webpage W3, providing that core content to a search service to obtain additional contextual suggestions relevant to the core content of webpage W3. In some implementations, however, the browser may close contextual search area 130 and restore display area 120' to display area 120 in response to selection of a search result. In some implementations, the browser 110 may maintain the search result page 236 in the contextual search area 130.

In the example of FIG. 2F, the contextual search area 130 includes a page description 242. The page description 242 may follow any contextual search suggestions 238 for the webpage W3. The page description 242 may be triggered by a control (not shown). In some implementations, the page description may be some or all information about the webpage provider taken from an authoritative source, e.g., a WIKIPEDIA page, an "about" section from a directory, etc. In some implementations, content may be selected using a model. In some implementations, a generative model may be used to generate the page description 242. The page description 242 represents details about the source of the webpage W2.

Figure 3A:
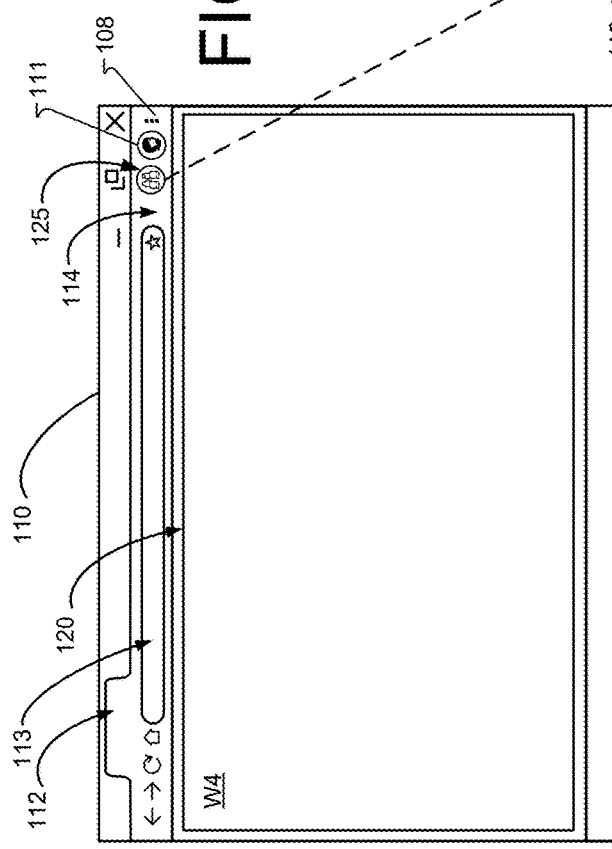
FIGS. 3A and 3B are diagrams that illustrate another variation of initiation of a contextual search tool in a contextual search area for content displayed within a display area of a browser, according to an implementation.
Figure 3B:
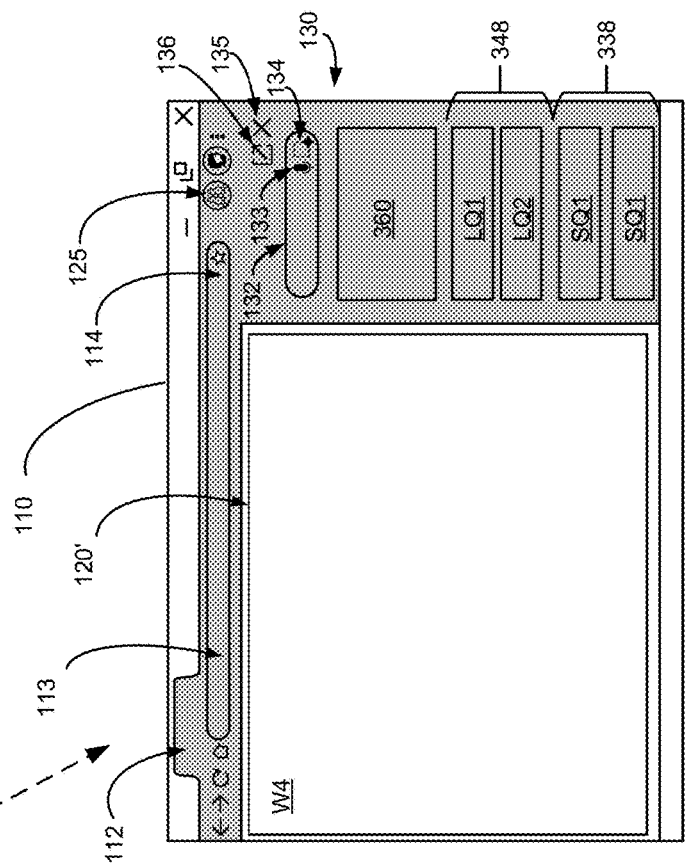

FIGS. 3A and 3B are diagrams that illustrate another variation of a contextual search tool in a contextual search area for content displayed within a display area of a browser, according to an implementation. In the example of FIGS. 3A and 3B, the contextual search tool includes generative content that is generated using the context of the main content (e.g., the core content). In FIG. 3A, website W4 is the source of the main content displayed in the display area 120 of the browser 110. The website W4 may include content not currently displayed in the display area 120. In some instances, the website W4 may be an infinite scrolling site, which always has additional content not currently displayed in the display area 120.

In response to a user selecting the tool icon 125, the browser may render the main content in display area 120' and render the contextual search tool in contextual search area 130, as described above. The controls of the contextual search tool are similar to those described with regard to FIGS. 1B and 3B. In the implementation of FIG. 3B, the contextual search tool includes several examples of contextual suggestions, such as generated content 360, local suggestions 348 (LQ1 and LQ1) and contextual search suggestions 338 (SQ1 and SQ2). The generated content 360 may be a summary of the main content generated by a generative language model. For example, the core content may be provided as input to a generative language model, which generates the summary and provides it as generated content 360. In some implementations, suggested searches may be generated based on other content in the webpage W4 or based on sources the generative language model used to generate the response. These are illustrated as LQ1 and LQ2 in FIG. 3B. Other contextual search suggestions SQ1 and SQ2, as described herein, may also be provided in the contextual search area 130. In some implementations, one or more of the contextual search suggestions SQ1 or SQ1 and/or LQ1 or LQ2 may be queries related to facts presented in the generated content 360.

Figure 3C:
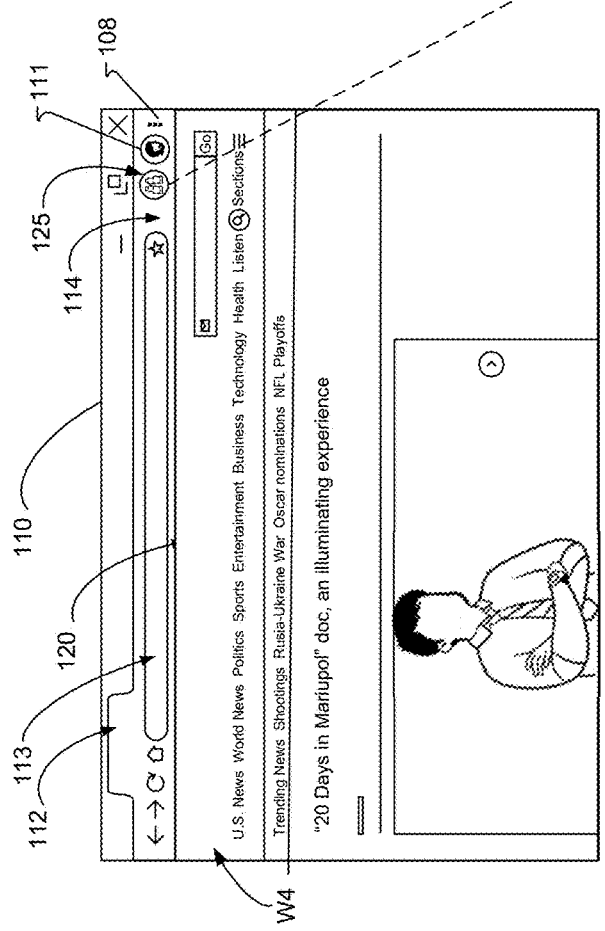
FIG. 3C illustrates example main content corresponding to FIG. 3A.
Figure 3D:
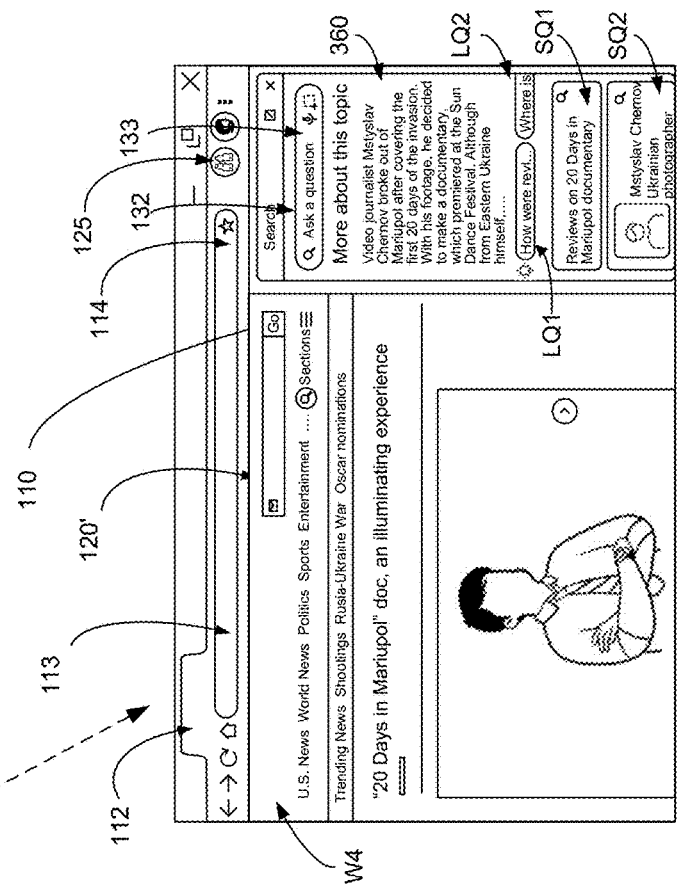
FIG. 3D illustrates an example contextual search area with example generated content, local search queries, and contextual search suggestions corresponding to FIG. 3B, according to an implementation.

FIG. 3C illustrates example main content corresponding to FIG. 3A. FIG. 3D illustrates an example contextual search area with example generated content 360, local search queries LQ1 and LQ2, and contextual search suggestions SQ1 and SQ2 corresponding to FIG. 3B, according to an implementation.

Figure 3E:
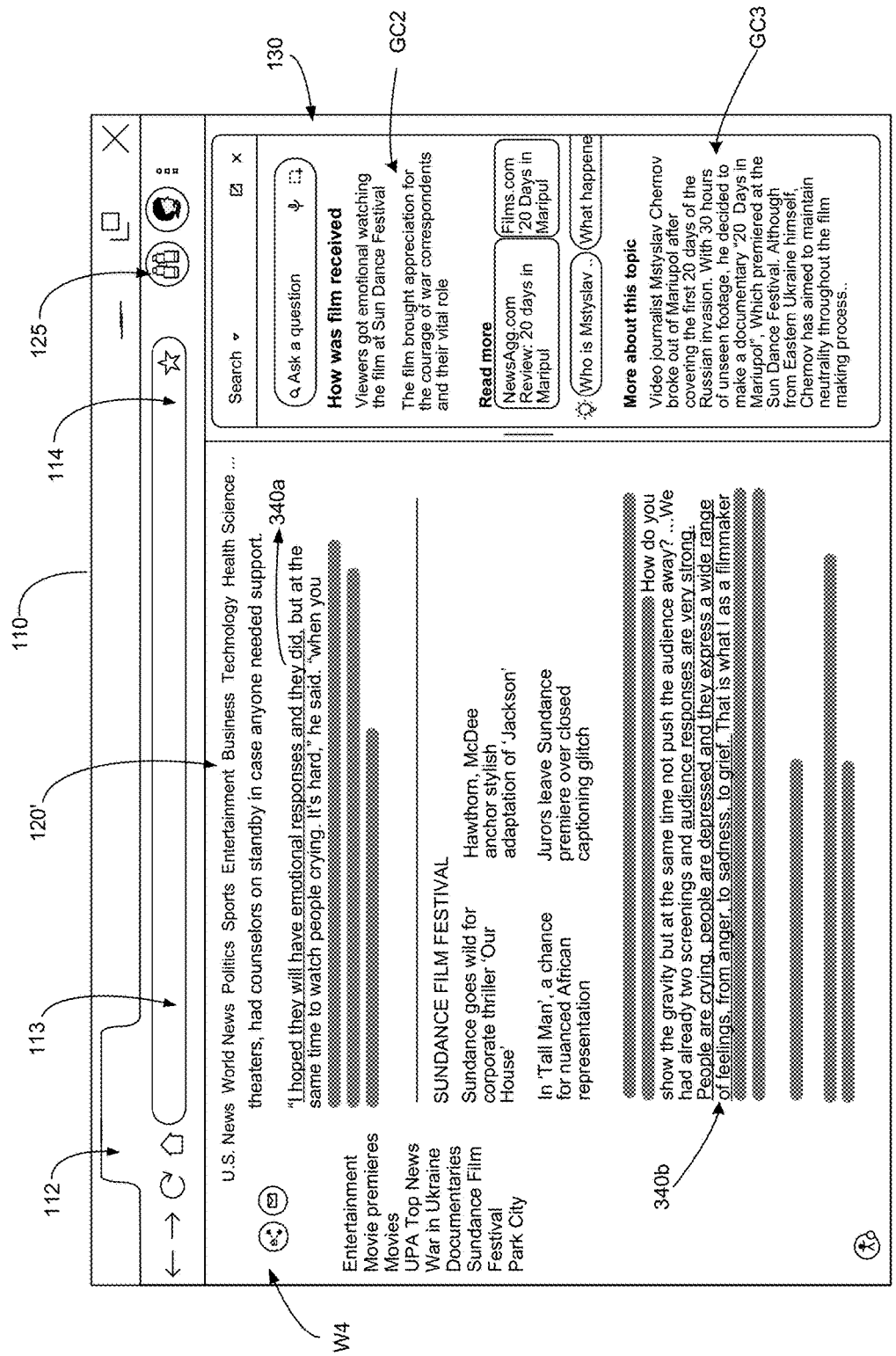
FIG. 3E is a diagram illustrating a contextual search area 130 with a result of a contextual search query selected in FIG. 3D.

FIG. 3E is a diagram illustrating a contextual search area 130 with a result of a contextual search query LQ1 selected in FIG. 3D. LQ1 is a query relating to how the movie discussed in the main content of the display area 120 was received. Like FIG. 3D, the contextual search area 130 of FIG. 3E includes generated content GC2 and GC3. In addition, the browser 110 changes the appearance of (e.g., highlights, underlines, etc.) content from the website W4 (e.g., underlined section 340a, underlined section 340b) relevant to the query (LQ1) and generates a summary of the reactions from sources available via the Internet.

In some implementations (not shown), the contextual search area 130 may include a dialog input area, similar to dialog input area 170 of FIG. 1H. In some implementations, the search box 132 may be the dialog input area. In some implementations, the contextual search area 130 may include a separate dialog input area. Using the dialog input area the user may initiate a dialog with a generative language model, e.g., by entering a prompt input. A benefit of disclosed implementations is that the browser 110 may be configured to provide the core content of the display area 120' in addition to the text (prompt) provided by the user via the dialog input area to the language model. Thus, the core content becomes part of the dialog context. This enables a user to ask questions about the core content and can also help the language model provide a more relevant generated response. As with other disclosed implementations, the core content may be determined at the client device, so that certain information displayed in the display area 120' is excluded from the core content, as discussed herein. The dialog context may include the prompt, the core content, and any prior prompts and generated content that precede the current prompt. This dialog context may be denormalized before being processed by the generative language model or as part of being processed by the generative language model. Thus, for example, a current prompt of 'what style is the picture on the left' may be denormalized to identify an image in the display area to the left of another image, and formulate a prompt that analyzes the style of that image. Likewise, a prompt of "where can I buy this" can be denormalized to identify a main entity referred to in the core content and/or in a selected region. In some implementations, with user permission, attributes about the user may be included in the context. For example, a user's location may be used to return retail stores within a specified radius of the user's general location when generating a response for the "where can I buy this" prompt. A response generated by the generative language model is provided as a response to the current prompt and becomes part of the dialog context. In some implementations, the dialog context is limited to a predetermined number of prior prompts and responses.

Figure 4A:
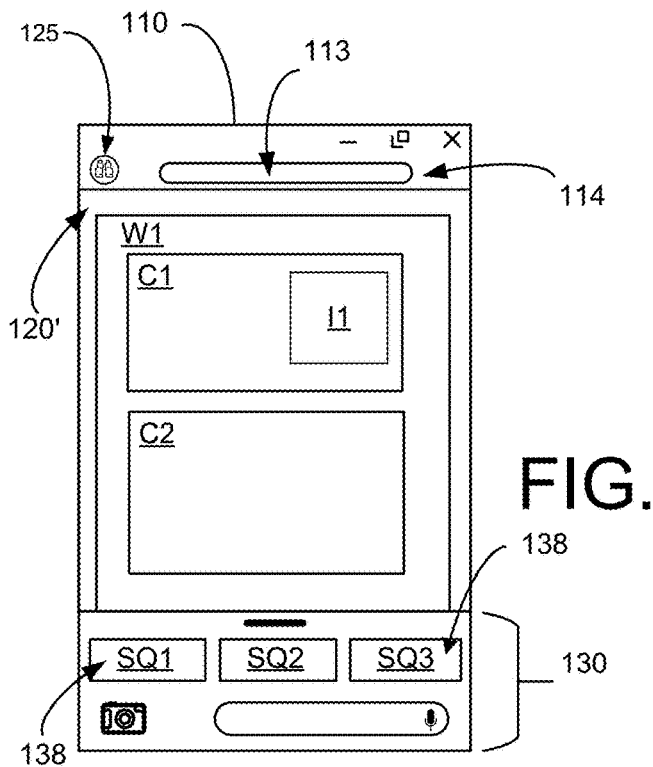
FIGS. 4A and 4B illustrate a contextual search tool in a contextual search area on a device with a limited display area.
Figure 4B:
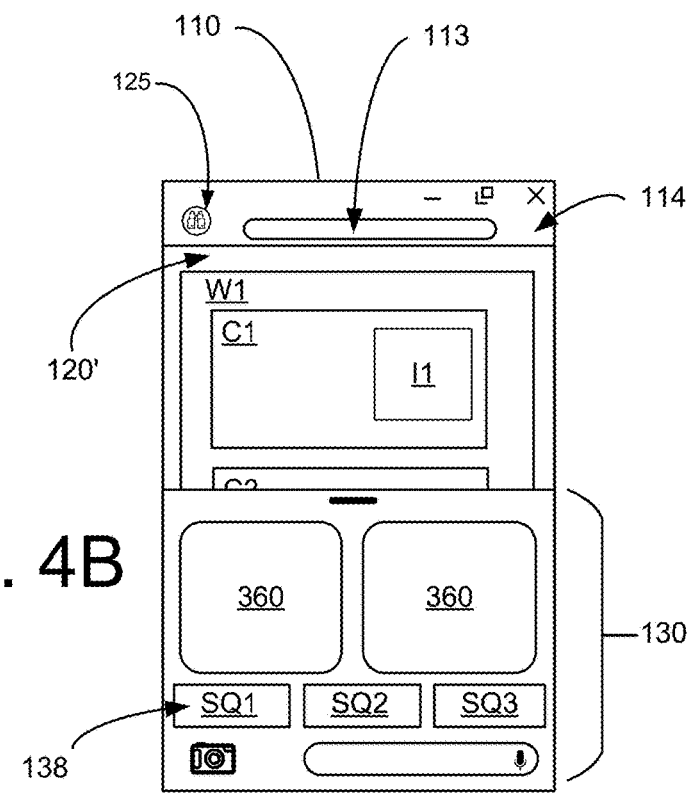
Figure 4C:
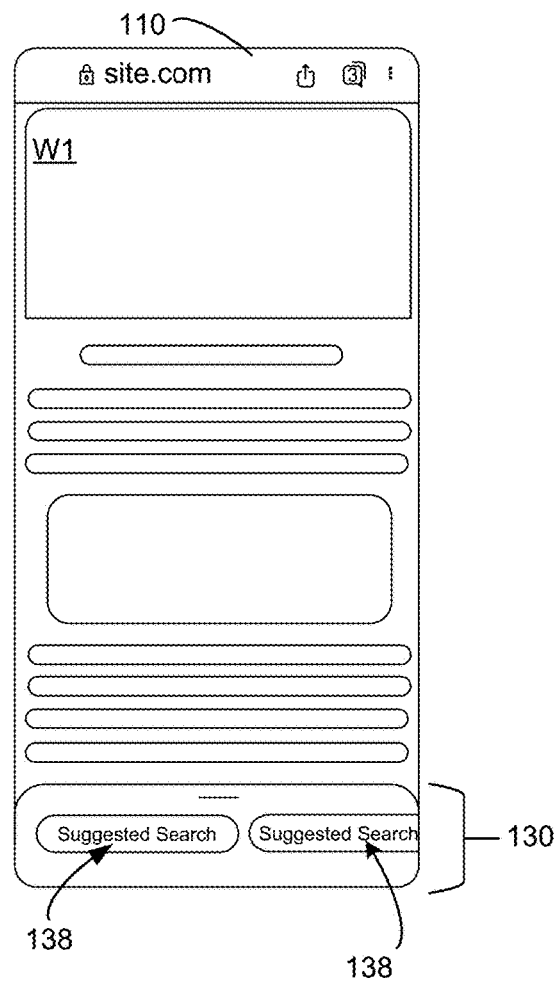
FIG. 4C illustrates an example contextual search area corresponding to FIG. 4A, according to an implementation.
Figure 4D:
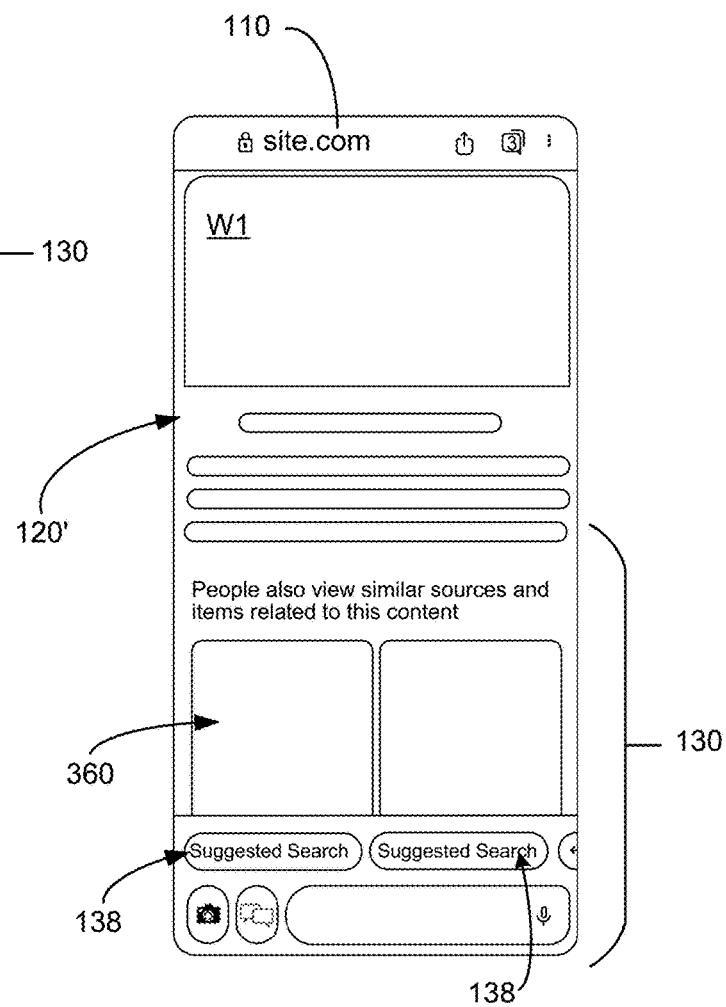
FIG. 4D illustrates an example contextual search area corresponding to FIG. 4B, according to an implementation.

FIG. 4A illustrates a contextual search tool in a contextual search area 130 on a device with a limited display area. The contextual search tool can be any of the implementations described above with respect to FIGS. 1A through 1I, 2A through 2F, and/or 3A through 3E but because the screen is smaller than the screen illustrated in these prior figures, the contextual suggestions may include fewer suggestions, may be represented differently, and/or include fewer different kinds of elements. The contextual search area 130 of FIG. 4A may be partially hidden initially. In other words, the contextual search area 130 of FIG. 4A may be an overlay window (e.g., similar to contextual search area 130 of FIG. 1I) that is initially only partially visible. FIG. 4B illustrates a contextual search area 130 with an overlay window expanded. The contextual search area 130 of FIG. 4B is still an area separate from the display area 120' but within the browser 110. FIG. 4C illustrates an example contextual search area corresponding to FIG. 4A, and FIG. 4D illustrates an example contextual search area corresponding to FIG. 4B, according to an implementation. Although the contextual search area 130 illustrated in FIGS. 4A through 4D as an overlay window at the bottom of the display area 120', implementations include an overlay window at either side or at the top of the display area 120'. In some implementations, the location of the overlay window may be dependent on a device type and/or an orientation of the device. The contextual search area 130 can also be an overlay window on a device without limited display area.

In some implementations the contextual search area 130 of any of the figures described above can include one or more feedback controls. Feedback controls may be used to collect, with user permission, preference information. Preference information can include information about user interactions with suggestions. A feedback control is an interactive user interface element used to collect direct feedback, which can be recorded as preference information. A feedback control may enable a user to dismiss a suggestion. Dismissing a suggestion may be interpreted as negative feedback for (negative user interaction with) the suggestion. A feedback control may be an interactive user interface element that enables a user to indicate support for a suggestion. The interaction can be with any kind of suggestion, including additional queries, generated content, search results, or any other content presented in the contextual search area 130. In some implementations, the user interaction information may include user selection of a suggestion. This can be interpreted as positive feedback for (a positive user interaction with) the suggestion. In some implementations the browser may provide a user interface for a user to provide preference information. Such preference information may include favored resource providers (e.g., favored merchants, favored news sites, favored social media sites and/or favored influencers on a social media site, etc.). Such preference information may include favored attributes for particular entity categories and/or particular categories of resources. For example, a user may provide favored attributes for shoppable resources, such as price, review ratings, and/or dimensions, etc.; a user may provide favored attributes for celebrities; etc. In some implementations, the user interface for providing preference information may include controls for indicating preference for certain types of suggestions and/or for dismissing entirely certain types of suggestions.

In some implementations, with user permission, the preference information may be recorded, e.g., in a user preference file. In some implementations, the preference information may be provided with the core content and used to determine the context suggestions. In some implementations, the preference information may be used to further train a model, such as the context suggestions may be based, at least in part, on the user preference file. In some implementations, with user permission, one or more models may be further trained (fine-tuned) using the preference information. In some implementations, preference information may lack any information identifying a particular user. For example the preference information may pair a resource with selected suggestions and/or dismissed suggestions. The system may use this user-agnostic preference information to fine-tune a model, such as a contextual context engine, to favor (keep, up-rank) selected context suggestions and disfavor (filter out, down-rank) dismissed suggestions.

Figure 5:
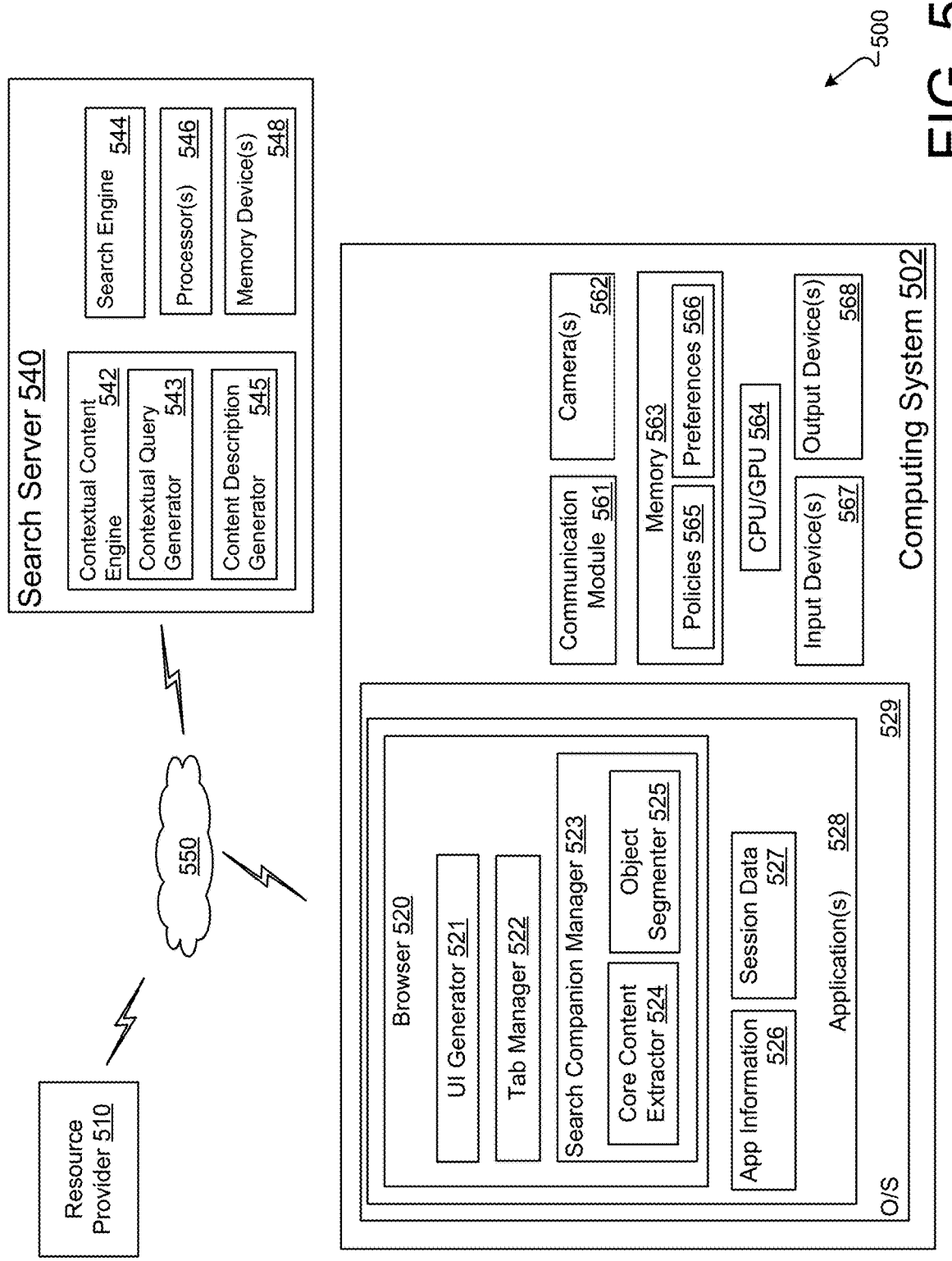
FIG. 5 is a diagram that illustrates a computing system and search server for implementing the concepts described herein.

FIG. 5 illustrates a system 500 including a computing system 502 and a search server 540 configured for implementing the concepts and various implementations shown and described herein. The computing system 502 can be a computing device with a limited screen size, such as a smartphone, a smart watch, smart (e.g., A/R or V/R glasses), a tablet, etc. The computing system 502 can be a computing device with a larger screen size, such as a desktop computer, a laptop, a netbook, a notebook, a tablet, a smart TV, a game console, etc., that runs a browser. In general, the computing system 502 can represent any computing device that executes a browser. As shown in FIG. 5, the computing system 502 is configured to communicate with the search server 540 and/or a resource provider 510 (e.g., a web server) via a network 550. The computing system 502 includes at least a browser 520 and a search companion manager 523. In some implementations, the browser 520 is configured to manage resource content, such as webpage content, provided by the resource provider 510 (e.g., a web server). In some implementations, the browser 520 is configured to operate as one of several applications 528 executed via an operating system (O/S) 529. The browser 520 can be configured to implement portions of the user interface, contextual suggestions, search results, windows, browser areas, and/or so forth, as described in connection with the implementations described herein.

As shown in FIG. 5, the computing system 502 includes several hardware components including a communication module 561, one or more cameras 562, a memory 563, a central processing unit (CPU) and a graphics processing unit (GPU) 564, one or more input devices 567 (e.g., touch screen, mouse, stylus, microphone, keyboard, etc.), and one or more output devices 568 (screen, speaker, vibrator, light emitter, etc.). The hardware components can be used to facilitate operation of the browser 520, the search companion manager 523, and/or so forth of the computing system 502.

The browser 520 includes a user interface (UI) generator 521 configured to generate and/or manage the various user interface elements of a browser such as browser 110 as shown and described herein. For example, the UI generator 521 can generate UI elements including the various windows in the browser 110 such as the display area 120, the contextual search area 130, shown in at least FIGS. 1A through 1H, FIGS. 2A through 2F, FIGS. 3A through 3E, and FIGS. 4A through 4D.

The browser 520 includes a tab manager 522 configured to generate and/or manage the various tabs (e.g., tab 112) of a browser such as browser 110. The browser 520 may be configured to, amongst other things, provide/perform the actions associated with actionable controls, such as links in the contextual search suggestions 138, 238, 338, generated content 360, tool icon 125, controls of the contextual search area 130, such as voice input control 133, region search control 134, close control 135, pop out control 136, search box 132, back control 156, etc. The tab manager 522 can also be configured to provide the menu of actions and cause performance of an action selected from the menu of actions.

The browser 520 includes a search companion manager 523 configured to generate and/or manage content rendering such as content in the contextual search area 130 (as shown in at least FIGS. 1B, 1D, 1E, 1F, 1I, 2B, 2D, 2E, 3B, 3D, 3E, and 4A through 4D). The search companion manager 523 can also be configured to determine when to trigger display of the contextual search area 130. Put another way, the search companion manager 523 can be configured to determine what events trigger rendering of the contextual search area 130 and whether the triggering event has occurred. Triggering events can include any of those discussed herein, such as selection of a tool icon (tool icon 125), selection of an action from a menu of actions, receipt of a voice command, etc. In some implementations, the search companion manager 523 may determine whether to display a condensed context search tool interface or the full context search tool interface (e.g., in a contextual search area 130). In some implementations, the search companion manager 523 may include an object segmenter 525. The object segmenter 525 may be configured to make different portions of the displayed main content of a resource selectable, e.g., by classifying the portions into different classes. Thus, for example, entities recognized in the main content may be assigned to a respective class. Even if an entity is not recognized, portions of the main content that are part of a same object may be assigned to a respective class. In such implementations, as a user hovers over an image the search companion manager 523 may provide an indication of the portion of the image included in the class. Such an implementation may make it easier for a user to ask questions about that part of the main content.

In some implementations, the search companion manager 523 can include core content extractor 524. In some implementations, portions of the core content extractor 524 may be part of the browser process. In some implementations, the core content extractor 524 is not integrated into the search companion manager 523. The core content extractor 524 may be configured to identify and extract core content from the main content of the displayed resource. In other words, the core content extractor 524 may be configured to identify which content associated with a resource displayed in the display area of a browser is core content. As described herein, the core content extractor 524 may take as input a DOM tree and/or an accessibility tree generated by the browser 520 for the resource and determine core content using the input. A benefit of using both a DOM tree and an accessibility tree is additional descriptive nodes in the accessibility tree for DOM elements such as images. A resource provider of the resource and/or a location (e.g., URL) of the resources may be considered core content. The core content extractor 524 may be configured to ignore or exclude certain elements from the core content. These elements can include user information, or in other words elements provided by a user (e.g., associated with input controls), elements describing a user (e.g., usernames, profile information, account numbers, etc.), etc. These elements can include sensitive information. Sensitive information may include age-restricted content (e.g., adult content, whether text or images). Sensitive information may include account information (e.g., a page from a financial institution). Thus, in some implementations, there may be little core content provided to the search server 540 because the majority of the core content is excluded by the core content extractor 524 based on a type of the resource (e.g., the resource is a sensitive resource). In some implementations, when a resource is determined to be a sensitive resource, not all features of the contextual search tool may be enabled. For example, generative content may be disabled for some or all sensitive types of sensitive resources. In some implementations, the core content extractor 524 may be a machine-learned model that executes on the computing system 502. The model may be trained to detect the sensitivity of the resource. The model may be trained to determine what to extract based on the sensitivity. The model may be trained to exclude (e.g., ignore) certain types of information, such as user information, sensitive information.

The browser 520 can be configured to generate and/or manage content rendering associated with a resource (e.g., webpage W1) in the display area 120 (including display area 120'), shown in the figures. The resource content can be provided to the computing system 502 by the resource provider 510. The browser 520 and/or the search companion manager 523 can be configured to implement one or both of the processes, or portions of the processes, described in connection with FIG. 6.

As shown in FIG. 5, session data 527 (which can be stored in memory 563 (not shown)) can be managed as, or by, one of the applications 528. The session data 527 can include data related to one or more browser sessions. The application information 526 can include information related to the various applications operating within and/or that can be executed by the O/S 529.

As shown in FIG. 5, the communication module 561 can be configured to facilitate communication with the resource provider 510 and/or search server 540 via the network 550 via one or more communication protocols. The camera 562 can be used for capturing one or more images, the memory 563 can be used for storing information associated with the browser 520 and/or search companion manager 523, other applications 528, O/S 529, etc. The CPU/GPU 564 can be used for processing information and/or images associated with the browser 520 and/or search companion manager 523. The computing system 502 also includes one or more output devices 568 such as communication ports, speakers, displays, and/or so forth. The functionality described in this application can be implemented based on one or more policies 565 and/or preferences 566 stored in the memory 563.

FIG. 5 illustrates some aspects of the search server 540. For example, the search server 540 includes one or more processors 546 (i.e., a processor formed in a substrate) and one or more memory devices 548. The search server 540 includes a search engine 544 configured to receive a request for a search (a query), from the computing system 502. The queries can include the search suggestions generated for and rendered in the contextual search area. The search engine 544 may be used to provide a search result page for a given query. A query can be a word, a phrase, multiple words, an image, a media file, etc., as is known. The search engine 544 is configured to search one or more data repositories for resources responsive to the query. Specifically, the search engine 544 may use an index of webpages, an index of images, an index of products, an entity repository, a news index, etc., to determine the content of the search result page. The search result page includes one or more search results, where each search result corresponds to a resource responsive to the query. Each search result includes a link to its respective resource. In some implementations, the search engine 544 can add additional elements to the search result page, such as ads, sponsored links, rich elements (knowledge panels, short answers, mini-apps, carousels, navigation links, etc.).

The search server 540 may also include a contextual content engine 542. The contextual content engine 542 may be configured to determine contextual suggestions, generative content, etc., for a given resource context, i.e., core content. In some implementations, with user permission, the contextual content engine 542 may be configured to determine contextual suggestions based on preference information, e.g., stored in user preferences 566. For example, the preference information (preference data) may be from a profile of a user may include user preferences considered when making contextual suggestions. In some implementations, the preference information (preference data) may be inferred from browsing history, with user permission. For example, the preference information may include actions taken by the user with respect to prior contextual suggestions. The actions can include selections of a prior contextual suggestion. The actions can include dismissal of a prior contextual suggestion. In some implementations, the contextual content engine 542 may include (or may have access to) a contextual query generator 543. The contextual query generator 543 may be configured to suggest searches (suggested queries) given an input, such as the core content and/or the location of the resource (the URL). The contextual query generator 543 may be configured to rank suggested searches (suggested queries) differently based on the request originating from the search companion manager 523 rather than from a search engine home page or from other applications 528 running on the computing system 502. The contextual content engine 542 may be configured to generate page descriptions, e.g., such as page description 242 of FIG. 2F. In some implementations, the page description may be generated by a content description generator 545.

The contextual content engine 542 may include content description generator 545. The content description generator 545 may be or may include a generative language model, also referred to as a large language model. Such generative language models can generate natural language responses to prompts, such as prompts entered into a search box or dialog input area. In some implementations, the content description generator 545 may include or have access to several different models. The content description generator 545 may be configured to take the core content as input and provide a generated summary for the core content. The generated summary may be a sentence or a few sentences. The content description generator 545 may be configured to generate more than one summary for the core content. The content description generator 545 can be configured to generate additional summaries. The additional summaries may be about one or more entities (topics) identified in the content. The additional summaries may be about one or more entities (topics) related to entities identified in the content. For example, rather than suggesting a search for related products, the content description generator 545 may generate a summary about related products. As another example, the content description generator 545 may generate a summary about reviews about related products. The content description generator 545 may be configured to generate answers to a prompt about the core content, e.g., a prompt entered in a dialog input area. The content description generator 545 can be configured to generate creative content related to the core content. For example, math problems, a poem, a party menu, party ideas, etc., can be generated and provided by the content description generator 545 in response to a prompt. Although illustrated as part of the search server 540, in some implementations, one or more components of the contextual content engine 542 may be implemented at the computing system 502.

The content description generator 545 may be configured to add annotations (e.g., footnotes) to the generated summaries. The annotations may be actionable, e.g., so that selecting a footnote causes the content in the display area of the browser to scroll or causes a resource to be displayed in the contextual search area. In some implementations, the content description generator 545 may be configured to suggest searches. Thus, the content description generator 545 or the contextual query generator 543 may suggest additional searches. The content description generator 545 may be configured to take as input a dialog context, which includes the core content, and provide a generated response in return. The generated response may also include annotations. The generated response may include additional search suggestions.

Figure 6:
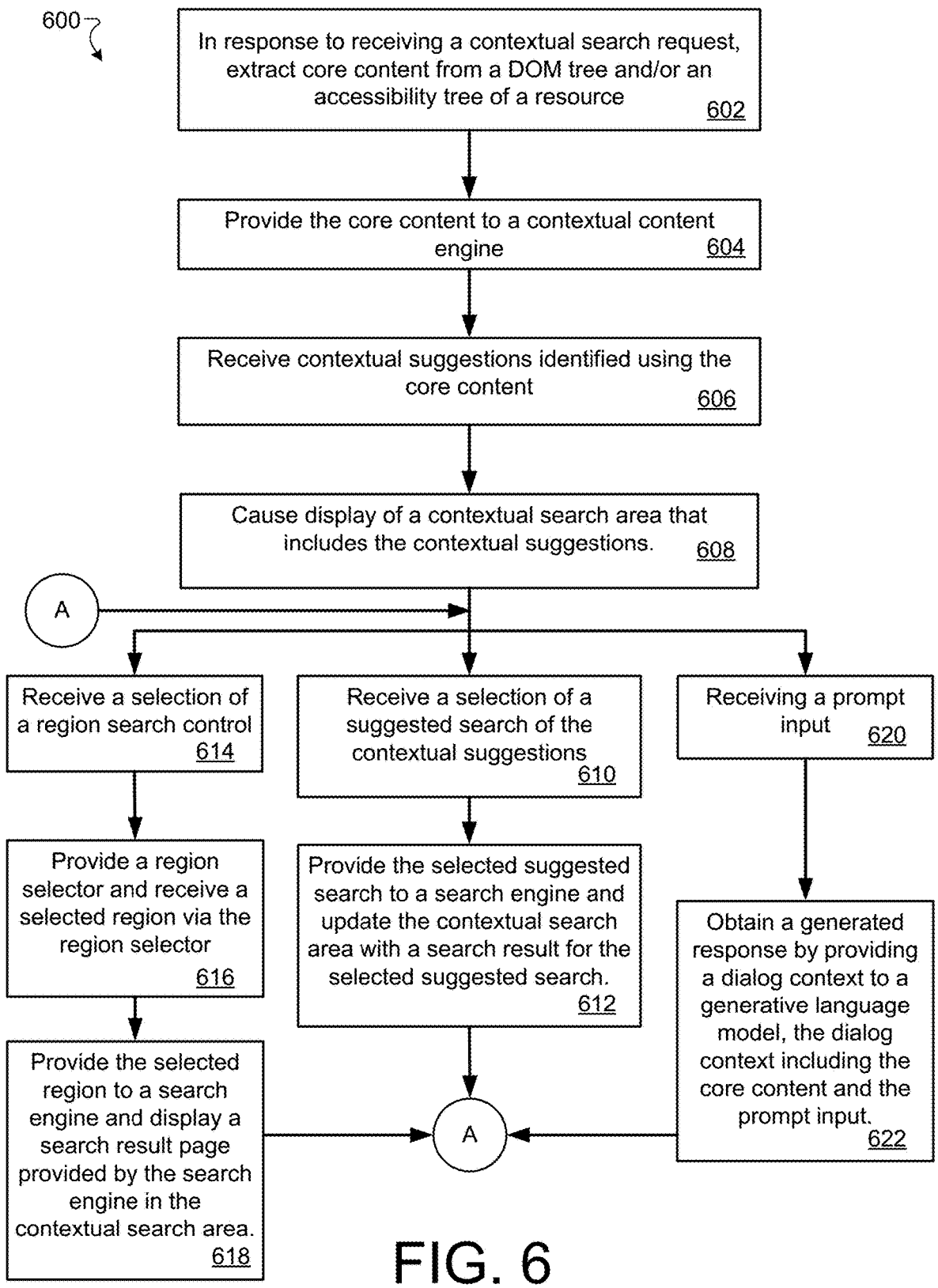
FIG. 6 is a flowchart illustrating an example process for providing a contextual search tool, according to an implementation.

FIG. 6 is a flowchart that illustrates an example method 600 of performing at least some of the concepts described herein in the various figures. Many elements of the method 600 can be implemented by the system shown in at least FIG. 5. In particular, the method 600 can be performed by a browser, (e.g., browser 520) of a computing system 502. The example method 600 is an example of triggering display of the contextual search area (contextual search area 130) in response to a contextual search request. The contextual search request can be triggered by the user, e.g., via interactions with an icon, a menu option, etc. At step 602, the system may extract core content from the main content of a resource. The main content may be represented by a DOM tree. The main content may be represented by an accessibility tree. The main content may be represented by a DOM tree and an accessibility tree. The core content can be identified as content provided by an entity associated with the resource, or in other words, content hosted at a domain associated with the resource as opposed to content provided from a source not associated with the domain. Put another way, core content may exclude content associated with an entity that is not the content provider of the resource (e.g., excluding advertising content). The main content can be identified as content in the viewport, or in other words currently visible to the user. The main content can be identified as any content in the DOM tree and/or accessibility tree regardless of whether it is in the viewport. In some implementations, content in the viewport may be indicated as such in the core content (extracted content). This may give the visible content more weight (a higher weight) in determining the contextual suggestions, e.g., contextual search suggestions and/or generated content. As discussed herein, some content may be excluded from the core content based on the type of information (e.g., user information, sensitive information, etc.) At step 604 the core content is provided to a contextual content engine, e.g., at search server 540. The contextual content engine uses the core content to generate contextual suggestions.

At step 606 the contextual suggestions are received from the contextual content engine. The contextual suggestions may include generated summaries. The contextual suggestions may include suggested searches. The contextual suggestions may include page descriptions. The types of suggestions included may be determined by a category of the resource. For example, different types of suggestions may be provided for a resource categorized as a shopping resource than a resource categorized as a news article or a resource about a celebrity. Similarly, the information included in a suggestion may be based on the category of a resource. The suggestions can be ordered based on the category of a resource. The suggestions can be ordered based on anticipated user actions for the category of a resource. In some implementations, a user may customize the types of suggestions included for a category of resource and/or the type of information included in a suggestion. For example, a user may provide a preference for certain merchants, certain news sites, certain social networks, certain attributes of entities (e.g., price and dimensions for products, etc.), etc. At step 608 the system may display the contextual suggestions in a contextual search area that is outside of the display area but within the browser. The display of the contextual search area may cause the display area to shrink in size, e.g., to make room on the display for the contextual search area. In some implementations, the contextual search area may be an overlay window that can overlay the display area. The contextual search area is considered outside the display area whether it is displayed concurrently with the display area or as an overlay window.

Once the contextual search area is displayed, the user may interact with the content of the contextual search area. For example, suggested searches displayed in the contextual search area may be actionable (selectable). At step 610, the system may receive a selection of a suggested search. At step 612, in response to the selection, the system may provide the selected suggested search to a search engine. The search engine may use the suggested search as a query and may provide a search result. The system may, in response to receiving the search result, render the search result page in the contextual search area. Thus, the search can be accomplished without navigating away from the main content. In some implementations, selection of a search result may trigger fetching and rendering content for a new resource (the resource associated with the selected search result) in the display area. In some implementations, method 600 starts over at step 602 with the new resource.

As another example, the contextual search area may include a region search control. The region search control enables a user to select a portion of the displayed content (including all of or a portion of a displayed image). At step 614 a selection of the region search control is received. At step 616 the system provides a region selector that enables a user to designate a selected portion of the displayed content. At step 618 the selected region is provided to a search engine. In response, the search engine provides a search result page. The search result page is displayed in the contextual search area. As in step 612, selection of a search result may trigger fetching and rendering content for a new resource (the resource associated with the selected search result) in the display area. In some implementations, method 600 starts over at step 602 with the new resource. In some implementations, the system may provide a refinement tool. The refinement tool may enable a user to further crop the selected portion and resubmit a query for the cropped portion.

Some implementations may include a prompt input in the contextual search area. At step 620, the system may receive a prompt input from the user, e.g., from a dialog input area and/or from a search box. At step 622 the system may obtain a generated response for the prompt input by providing a dialog context to a generative language model. The dialog context includes not only the prompt input, but also the core content. In some implementations, the dialog context can include prior prompt input and generated responses related to the displayed resource. The core content provides context for the generative language model in generating a response to the prompt. The system may display the response to the prompt in the contextual search area. In some implementations, a change in the resource displayed in the display area clears out a dialog and signals a new dialog.

Figure 7:
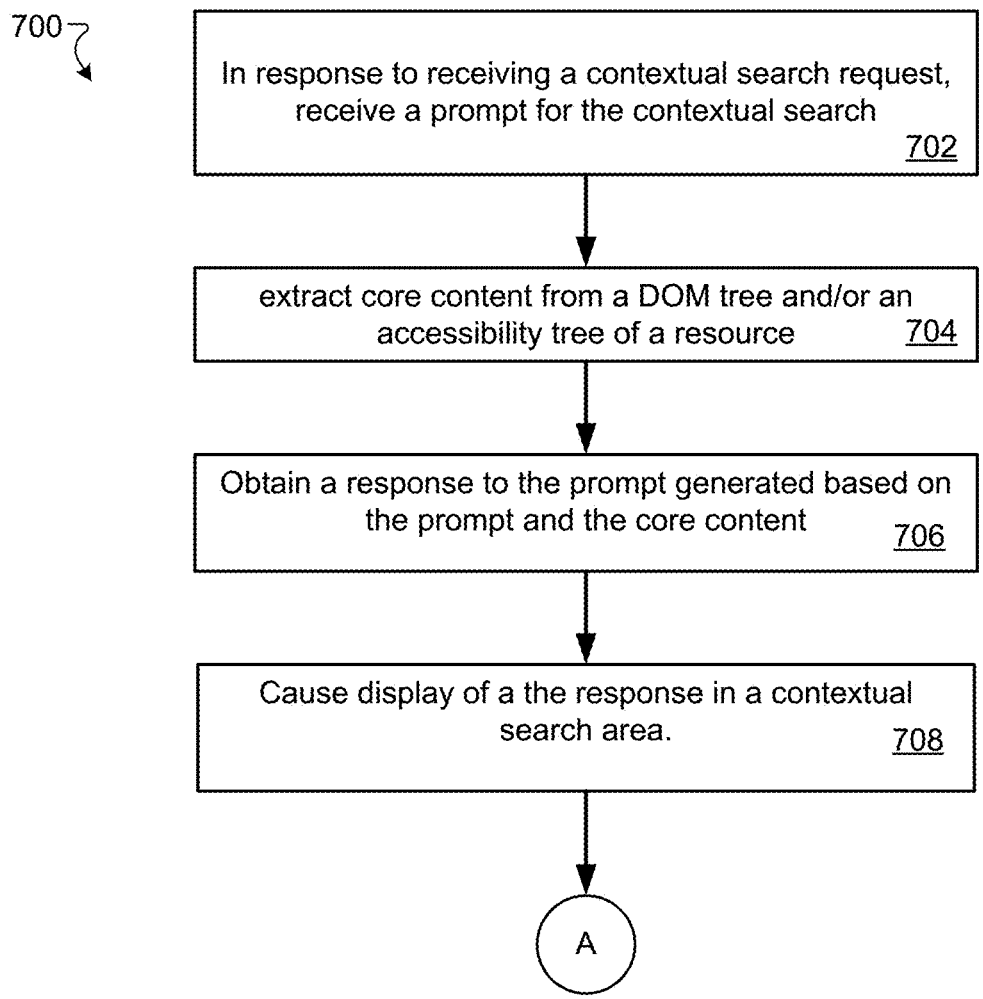
FIG. 7 is a flowchart illustrating an example process for providing a contextual search tool, according to an implementation.

FIG. 7 is a flowchart that illustrates an example method 700 of performing at least some of the concepts described herein in the various figures. Many elements of the method 700 can be implemented by the system shown in at least FIG. 5. In particular, the method 700 can be performed by a browser, (e.g., browser 520) of a computing system 502. The example method 700 is an example of triggering display of the contextual search area (e.g., contextual search area 130) in response to a contextual search request. The contextual search request can be triggered by the user, e.g., via interactions with an icon, a menu option, etc. At step 702 the system may receive a prompt input for the contextual search. The prompt input can be any natural language text provided by the user, e.g., via a dialog input area. The prompt input can be normalized, e.g., to replace pronouns. In some implementations, the normalization may be based, at least in part, on core content. In some implementations, receiving the prompt input can be a selected portion of the main content. The selected portion may be an object identified in an image of the main content, e.g., by an object segmenter. In some implementations, the selected portion can be a region selected via a click-and-drag gesture or a circling gesture, or some other region selector.

At step 704, the system may extract core content from the main content of a resource in response to receiving the contextual search request. The main content may be represented by a DOM tree. The main content may be represented by an accessibility tree. The main content may be represented by a DOM tree and an accessibility tree. The core content can be identified as content provided by an entity associated with the resource, or in other words, content hosted at a domain associated with the resource rather than content provided from a source not associated with the domain. Put another way, core content may exclude content associated with an entity that is not the content provider of the resource (e.g., core content may represent non-advertising content). The main content can be identified as content in the viewport, or in other words currently visible to the user. The main content can be identified as any content in the DOM tree and/or accessibility tree regardless of whether it is in the viewport. In some implementations, content in the viewport may be indicated as such in the core content. This may give the visible content more weight in determining the contextual suggestions, such as contextual search suggestions and/or generated content. As discussed herein, some content may be excluded from the core content based on the type of information (e.g., user information, sensitive information, etc.)

At step 706, the system may provide the prompt (including the portion of the image selected, if one exists) and the core content to a generative language model. The generative language model can be part of a contextual content engine. The generative language model may use the prompt and the core content to generate a response to the prompt. The response may be generated content based on the core content. The core content may be used as dialog context for the prompt. The response may include information about the core content, such as information about an entity identified in the core content. The response may include creative content. The response is based on the prompt. The response can include contextual suggestions. In some implementations, the response can include generated content and search results based on the prompt.

At step 708 the system receives the response and displays the response in a contextual search area. The contextual search area is outside of the display area of the browser but within the control of the browser. The contextual search area may be an overlay interface that partially obscures the display area. The contextual search area may be at an edge of the display area and may cause the display area to shrink in size, e.g., to make room on the display for the contextual search area. The contextual search area is considered outside the display area whether it is displayed concurrently with the display area or as an overlay window.

Once the contextual search area is displayed, the user may interact with the content of the contextual search area and/or submit another prompt, as described with respect to steps 610 to 622 of FIG. 6.

The contextual search tool discussed above can be used to provide additional context in various settings. In one example, a user may be browsing a news item from a news source, such as a social media site, a news feed, a publishing website, etc. The contextual search tool can provide the user a broader context for a news item, validate the authenticity of images, explore contrasting viewpoints, and/or access the credibility of the source. In another setting, a traveler reading a travel blog may be able to get reviews, find geographic information, and/or make reservations. In another setting, a shopper may use the contextual search tool to identify products in images, compare multiple products, synthesize user reviews, find deals on an item, etc. In another context, a student doing homework may be able to get related educational content, view step-by-step instructions on how to solve a problem, ask related questions to deep dive on a topic, and get multiple points of view. Implementations can support other types of journeys.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system (e.g., computer-implemented methods) including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube), LED (light emitting diode), or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

A number of implementations have been described. Nevertheless, it will be understood that various modifications may be made without departing from the spirit and scope of the disclosed implementations.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

Clause 1. A computer-implemented method, comprising: receiving a contextual search request relating to main content, the main content being displayed in a display area of a browser; extracting at least some content from the main content; receiving a contextual suggestion associated with the at least some content; and as a response to the contextual search request, causing display of the contextual suggestion in a contextual search area within the browser.

Clause 2. The method of clause 1, wherein the contextual suggestion is based on a category of the main content that is determined based on the at least some content.

Clause 3. The method of clause 1 or clause 2, wherein the contextual suggestion is one of a plurality of contextual suggestions and the plurality of contextual suggestions are ordered based on a category of the main content that is determined based on the at least some content.

Clause 4. The method of clause 1, wherein the contextual suggestion is one of a plurality of contextual suggestions and the plurality of contextual suggestions are ordered based on a category of an entity identified in the at least some content.

Clause 5. The method of clause 1, wherein the contextual suggestion is a search suggestion and the method further comprises: receiving a selection of the search suggestion; obtaining a search result page using the search suggestion as a query; and causing display of the search result page in the contextual search area.

Clause 6. The method of clause 5, further comprising: receiving a selection of a search result from the search result page; fetching second main content for a resource associated with the search result; extracting second content from the second main content; receiving a second contextual suggestion associated with the second content; and causing display of the second contextual suggestion in the contextual search area.

Clause 7. The method of clause 1, wherein the contextual suggestion is determined based on the at least some content and on preference information.

Clause 8. The method of any of clauses 1 to 7, wherein the at least some content is identified by a model using a document object model for the main content as input.

Clause 9. The method of any of clauses 1 to 7, wherein the at least some content is identified by a model using an accessibility tree for the main content as input.

Clause 10. The method of any of clauses 1 to 7, wherein the at least some content is identified by a model trained to exclude user information from the at least some content.

Clause 11. The method of any of clauses 1 to 10, wherein the at least some content is identified by a model trained to exclude information provided by an entity not associated with a provider of the main content from the at least some content.

Clause 12. The method of clause 1, wherein the contextual suggestion includes generated content describing an entity identified in the at least some content.

Clause 13. The method of clause 1, wherein the contextual suggestion is a suggested search related to an entity identified in the at least some content.

Clause 14. The method of clause 1, wherein the contextual suggestion is a description of the main content.

Clause 15. The method of any of clauses 1 to 14, further comprising: detecting a scrolling input; and in response to detecting the scrolling input, changing the contextual suggestion based on the main content in a viewport of the display area.

Clause 16. The method of clause 15, wherein changing the contextual suggestion includes: re-extracting content from the main content now in the viewport; and receiving a contextual suggestion associated with the re-extracted content.

Clause 17. The method of clause 15, wherein the contextual suggestion is a first contextual suggestion of a plurality of contextual suggestions and changing the contextual suggestion includes: re-ordering the plurality of contextual suggestions based on the scrolling input; and replacing the first contextual suggestion with a second contextual suggestion of the plurality of contextual suggestions based on the re-ordering.

Clause 18. The method of any of clauses 1 to 17, wherein the at least some content includes an indication of content that is visible in a viewport.

Clause 19. The method of clause 18, wherein the content that is visible in the viewport has a higher weight in determining the contextual suggestion than content not visible in the viewport.

Clause 20. A computer-implemented method, comprising: receiving a contextual search request for main content, the main content being displayed in a display area of a browser; receiving a prompt input; extracting content from the main content; receiving generated content based on the prompt input and the extracted content; and causing display of the generated content in a contextual search area that is within the browser.

Clause 21. The method of clause 20, further comprising: receiving a selected region of the main content, wherein the selected region is used as the prompt input.

Clause 22. The method of clause 21, wherein the selected region is a region determined to correspond to an object and receiving the selected region includes: detecting a hover input over the region; in response to detecting the hover input, changing an appearance of the region during the hover input; and receiving a selection of the region.

Clause 23. The method of any of clauses 20 to 22, further comprising: providing a condensed contextual search area with a dialog input area, wherein the prompt input is received in the dialog input area.

Clause 24. The method of any of clauses 20 to 23, wherein the generated content includes a search suggestion and the method further comprises: receiving a selection of the search suggestion; sending a query associated with the search suggestion to a search engine; receiving a search result page for the query; and causing display of the search result page in the contextual search area.

Clause 25. The method of clause 24, further comprising: receiving a selection of a search result from the search result page; fetching second main content for a resource associated with the search result; extracting second content from the second main content; receiving a contextual suggestion associated with the second content in response to providing the content to the search engine; and causing display of the contextual suggestion in the contextual search area.

Clause 26. The method of any of clauses 20 to 25, wherein the generated content is determined based on the extracted content, the prompt input, and preference information.

Clause 27. The method of any of clauses 20 to 26, wherein the extracted content is extracted by a model using a document object model for the main content as input.

Clause 28. The method of any of clauses 20 to 26, wherein the extracted content is extracted by a model using an accessibility tree for the main content as input.

Clause 29. The method of any of clauses 20 to 28, wherein the extracted content is identified by a model trained to exclude user information from the extracted content.

Clause 30. The method of any of clauses 20 to 29, wherein the extracted content is identified by a model trained to exclude information provided by an entity not associated with a provider of the main content from the extracted content.

Clause 31. The method of any of clauses 20 to 30, wherein the prompt input identifies an entity and the generated content includes information about the entity.

Clause 32. The method of any of clauses 20 to 31, further comprising: receiving contextual search suggestions based on the extracted content; and causing display of the contextual search suggestions with the generated content in the contextual search area.

Clause 33. The method of any of clauses 20 to 32, wherein the generated content relates to an entity identified in the extracted content.

Clause 34. A computing device comprising: a processor formed in a substrate; and a memory storing instructions that, when executed by the processor, cause the computing device to perform the method of any of clauses 1 to 33.

What is claimed is:

1. A computer-implemented method, comprising:
receiving a contextual search request relating to main content, the main content being displayed in a display area of a browser;
extracting at least some content from the main content;
receiving a contextual suggestion associated with the at least some content; and
as a response to the contextual search request, causing display of the contextual suggestion in a contextual search area within the browser.

2. The method of claim 1, wherein the contextual suggestion is based on a category of the main content that is determined based on the at least some content.

3. The method of claim 1, wherein the contextual suggestion is one of a plurality of contextual suggestions and the plurality of contextual suggestions are ordered based on a category of the main content that is determined based on the at least some content.

4. The method of claim 1, wherein the contextual suggestion is a search suggestion and the method further comprises:
receiving a selection of the search suggestion;
obtaining a search result page using the search suggestion as a query;
causing display of the search result page in the contextual search area;
receiving a selection of a search result from the search result page;

fetching second main content for a resource associated with the search result;
extracting second content from the second main content;
receiving a second contextual suggestion associated with the second content; and
causing display of the second contextual suggestion in the contextual search area.

5. The method of claim 1, wherein the at least some content is identified by a model trained to exclude user information from the at least some content.

6. The method of claim 1, wherein the at least some content is identified by a model trained to exclude information provided by an entity not associated with a provider of the main content from the at least some content.

7. The method of claim 1, wherein the contextual suggestion includes generated content describing an entity identified in the at least some content.

8. The method of claim 1, wherein the contextual suggestion is a suggested search related to an entity identified in the at least some content.

9. The method of claim 1, wherein the contextual suggestion is a description of the main content.

10. The method of claim 1, further comprising:
detecting a scrolling input; and
in response to detecting the scrolling input, changing the contextual suggestion based on the main content in a viewport of the display area.

11. The method of claim 10, wherein changing the contextual suggestion includes:
re-extracting content from the main content now in the viewport; and
receiving a contextual suggestion associated with the re-extracted content.

12. The method of claim 10, wherein the contextual suggestion is a first contextual suggestion of a plurality of contextual suggestions and changing the contextual suggestion includes:
re-ordering the plurality of contextual suggestions based on the scrolling input; and
replacing the first contextual suggestion with a second contextual suggestion of the plurality of contextual suggestions based on the re-ordering.

13. The method of claim 1, wherein the at least some content includes an indication of content that is visible in a viewport, wherein the content that is visible in the viewport has a higher weight in determining the contextual suggestion than content not visible in the viewport.

14. A computer-implemented method, comprising:
receiving a contextual search request for main content, the main content being displayed in a display area of a browser;
receiving a prompt input;
extracting content from the main content;
receiving generated content based on the prompt input and the extracted content; and
causing display of the generated content in a contextual search area that is within the browser.

15. The method of claim 14, further comprising:
receiving a selected region of the main content,
wherein the selected region is used as the prompt input.

16. The method of claim 15, wherein the selected region is a region determined to correspond to an object and receiving the selected region includes:
detecting a hover input over the region;
in response to detecting the hover input, changing an appearance of the region during the hover input; and
receiving a selection of the region.

17. The method of claim 14, further comprising:
providing a condensed contextual search area with a dialog input area,
wherein the prompt input is received in the dialog input area.

18. The method of claim 14, wherein the generated content includes a search suggestion and the method further comprises:
receiving a selection of the search suggestion;
sending a query associated with the search suggestion to a search engine;
receiving a search result page for the query; and
causing display of the search result page in the contextual search area.

19. The method of claim 18, further comprising:
receiving a selection of a search result from the search result page;
fetching second main content for a resource associated with the search result;
extracting second content from the second main content;
receiving a contextual suggestion associated with the second content in response to providing the content to the search engine; and
causing display of the contextual suggestion in the contextual search area.

20. The method of claim 14, wherein the generated content is determined based on the extracted content, the prompt input, and preference information.

21. The method of claim 14, wherein the extracted content is identified by a model trained to exclude user information from the extracted content.

22. The method of claim 14, wherein the extracted content is identified by a model trained to exclude information provided by an entity not associated with a provider of the main content from the extracted content.

23. The method of claim 14, wherein the prompt input identifies an entity and the generated content includes information about the entity.

24. The method of claim 14, further comprising:
receiving contextual search suggestions based on the extracted content; and
causing display of the contextual search suggestions with the generated content in the contextual search area.

25. The method of claim 14, wherein the generated content relates to an entity identified in the extracted content.

* * * * *